US011399587B2

United States Patent
Atashbar et al.

(10) Patent No.: US 11,399,587 B2
(45) Date of Patent: Aug. 2, 2022

(54) PRESSURE MONITORING SYSTEM FOR HELMETS

(71) Applicant: The Board of Trustees of Western Michigan University, Kalamazoo, MI (US)

(72) Inventors: Massood Zandi Atashbar, Portage, MI (US); Binu Baby Narakathu, Portage, MI (US); Simin Masihi, Kalamazoo, MI (US); Masoud Panahi, Kalamazoo, MI (US); Dinesh Maddipatla, Kalamazoo, MI (US)

(73) Assignee: The Board of Trustees of Western Michigan University, Kalamazoo, MI (US)

( * ) Notice: Subject to any disclaimer, the term of this patent is extended or adjusted under 35 U.S.C. 154(b) by 42 days.

(21) Appl. No.: 16/898,588

(22) Filed: Jun. 11, 2020

(65) Prior Publication Data
US 2020/0390181 A1    Dec. 17, 2020

Related U.S. Application Data

(60) Provisional application No. 62/860,286, filed on Jun. 12, 2019.

(51) Int. Cl.
*A42B 3/04* (2006.01)
*G01L 5/00* (2006.01)
*G01L 1/14* (2006.01)

(52) U.S. Cl.
CPC ............ *A42B 3/0433* (2013.01); *G01L 1/144* (2013.01); *G01L 5/0052* (2013.01)

(58) Field of Classification Search
CPC ..... A42B 3/0433; G01L 1/144; G01L 5/0052; G01L 1/146; G06F 3/0414; A63B 71/00
(Continued)

(56) References Cited

U.S. PATENT DOCUMENTS

| 4,837,129 A | 6/1989 | Frisch et al. |
| 4,883,271 A | 11/1989 | French |

(Continued)

FOREIGN PATENT DOCUMENTS

| EP | 2550411 | * 11/2017 | |
| KR | 20180029752 | * 3/2018 | |
| WO | WO2017185050 | * 10/2017 | ............... A61B 5/68 |

OTHER PUBLICATIONS

Gwin et al., "In situ Measuers of Head Impact Acceleration in NCAA Division I Men's Ice Hockey: Implications for ASTM F1045 and Other Ice Hockey Helmet Standards," Journal of ASTM Internationall, vol. 6, No. 6 Paper ID JAI101848; 2009; 10 pages.
(Continued)

*Primary Examiner* — Octavia Davis Hollington
(74) *Attorney, Agent, or Firm* — Price Heneveld LLP

(57) ABSTRACT

A pressure sensing system for measuring pressure acting between a user's head and a protective helmet includes a flexible article that is configured to fit between a wearable protective article and a body part of a user. The system further includes a pressure sensor array comprising a plurality of pressure sensors secured to the flexible article. The system may include a data acquisition module configured to provide data from the pressure sensor array to a computer having a display that provides pressure data to a user.

20 Claims, 18 Drawing Sheets

(58) Field of Classification Search
USPC .......................................................... 73/818
See application file for complete search history.

(56) References Cited

U.S. PATENT DOCUMENTS

| | | | |
|---|---|---|---|
| 5,343,569 | A | 9/1994 | Asare et al. |
| 5,534,290 | A | 7/1996 | Rainwater et al. |
| 5,713,082 | A | 2/1998 | Bassette et al. |
| 5,883,568 | A | 3/1999 | Boyden |
| 6,301,718 | B1 | 10/2001 | Rital |
| 6,332,226 | B1 | 12/2001 | Rush, III |
| 6,459,588 | B1 | 10/2002 | Morizuni et al. |
| 6,532,824 | B1 | 3/2003 | Ueno et al. |
| 6,826,509 | B2 | 11/2004 | Crisco, III et al. |
| 7,174,277 | B2 | 2/2007 | Vock et al. |
| 7,295,724 | B2 | 11/2007 | Wang et al. |
| 7,526,389 | B2 | 4/2009 | Greenwald et al. |
| 8,479,585 | B2 | 7/2013 | Shaw-Klein |
| 8,554,509 | B2 | 10/2013 | Crisco, III et al. |
| 9,943,128 | B2 | 4/2018 | Mashbar et al. |
| 2001/0047689 | A1 | 12/2001 | McIntosh |
| 2004/0252007 | A1 | 12/2004 | Lussey et al. |
| 2006/0284280 | A1 | 12/2006 | Borland et al. |
| 2007/0056081 | A1 | 3/2007 | Aspray |
| 2009/0099473 | A1* | 4/2009 | Dunseath ............... A61B 5/291 600/544 |
| 2011/0045253 | A1 | 2/2011 | Nielsen et al. |
| 2011/0277803 | A1 | 11/2011 | Grande et al. |
| 2012/0318070 | A1 | 12/2012 | Evans |
| 2013/0100030 | A1 | 4/2013 | Los et al. |
| 2013/0127060 | A1 | 5/2013 | Aboush |
| 2013/0304052 | A1 | 11/2013 | Rizq et al. |
| 2014/0088454 | A1 | 3/2014 | Mack |
| 2014/0149067 | A1 | 5/2014 | Merril et al. |
| 2014/0298921 | A1 | 10/2014 | Surapaneni et al. |

OTHER PUBLICATIONS

Manikandan, et al., "Micro Electro Mechanical System (MEMS) based Pressure Sensor in Barometric Altimeter," International Journal of Scientific & Engineering Research vol. 2, Issue 8, Aug. 2011; ISSN 2229-5518 (8 pages).
Foreman et al., "A Comparative Analysis for the Measurement of Head Accelerations in Ice Hockey Helmets using Non-Accelerometer Based Systems," Impakt Protective Inc., Kanata, Ontario, Canada; 2014 (13 pages).
Narakathu et al., "A Novel Fully Printed and Flexible Capacitive Pressure Sensor," IEEE 978-1-4577-1767-3/12, Western Michigan University, Kalamazoo, Michigan (4 pages).
Zang et al., "Advances of Flexible Pressure Sensors toward Artificial Intelligence and Health Care Applications," Materials Horizons, MH-REV-08-2014-000147.R1, Sep. 16, 2014 DOI: 10.1039/x0xx00000x, The Royal Society of Chemistry 2013 (19 pages).
Kameya et al., "Dual luminescent arrays sensor fabricated by inkjet-printing of pressure- and temperature-sensitive paints," Sensors and Actuators B: Chemical B190 (2014) 70-77, Aug. 13, 2013 (8 pages).
Gerlach et al., "Printed MWCNT-PDMS-Composite Pressure Sensor System for Plantar Pressure Monitoring in Ulcer Prevention," IEEE Sensors Journal, vol. 15, No. 7, Jul. 2015 pp. 3647-3656 (10 pages).
Holmer et al., "Extracting a Cardiac Signal From the Extracorporeal Pressure Sensors of a Hemodialysis Machine," EEE Transactions on Biomedical Engineering, vol. 62, No. 5, May 2015, pp. 1305-1315 (11 pages).
Kortelainen et al., "FFI averaging of multichannel BCG signals from bed mattress sensor to improve estimation of heart beat interval," Proceedings of the 29th Annual International Conference of the IEEE EMBS Cite Internationale, Lyon, France, Aug. 23-26, 2007, pp. 6685-6688 (4 pages).
Pyeong-Gook et al., "A Wearable Gesture Recognition Device for Detecting Muscular Activities Based on Air-Pressure Sensors," IEEE Transactions on Industrial Informatics, vol. 11, No. 2, Apr. 2015, pp. 485-494 (10 pages).
Chlaihawi et al., "A screen printed and flexible piezoelectric-based AC magnetic field sensor," Sensors and Actuators A 268: Physical, Oct. 12, 2017 (8 pages).
Tian et al., "A Graphene-Based Resistive Pressure Sensor with Record-High Sensitivity in a Wide Pressure Range," Scientific Reports 5:8603 DOI: 10.1038/srep08603, Feb. 27, 2015 (6 pages).
Ziaie et al., "Introduction to Micro-/Nanofabrication," 8.1 Basic Microfabrication Techniques, Part A Nanostructures, Micro-/Nanofabrication and Materials, pp. 231-269 (39 pages).
Narakathu et al., "Improved detection limits of toxic biochemical species based on impedance measurements in electrochemical biosensors," Biosensors and Bioelectronics 26 (2010) 923-928, Jul. 3, 2010 (6 pages).
Reddy et al., "Printed Capacitive Based Humidity Sensors on Flexible Substrates," 2011 American Scientific Publishers, Sensor Letters, vol. 9, 869-871, 2011, Nov. 11, 2010 doi:10 1166/sl.2011 1633 (3 pages).
Reddy et al., "Printed Electrochemical Based Biosensors on Flexible Substrates," IEEE Sensors 2010 Conference Western Michigan University, Kalamazoo, Michigan, pp. 1596-1600 (5 pages).
Atashbar et al., "Carbon Nanotube Based Biosensors," IEEE 2004, Western Michigan University, Kalamazoo, Michigan, pp. 1048-1051 (4 pages).
Maddipatla et al., "Development of a Novel Carbon Nanotube based Printed and Flexible Pressure Sensor," IEEE 2017, Western Michigan University, Kalamazoo, Michigan (4 pages).
Ali et al., "Printed strain sensor based on silver nanowire/silver flake composite on flexible and stretchable TPU substrate," Sensors and Actuators A 274 (2018) 109-115, Mar. 8, 2018 (7 pages).
Reddy et al., "Fully Printed Flexible Humidity Sensor," SciVerse ScienceDirect Procedia Engineering 25 (2011) 120-123, Sep. 4-7, 2011, Athens, Greece (4 pages).
Peng et al., "High Sensitivity Capacitive Pressure Sensor with Bi-Layer Porous Structure Elastomeric Dielectric Formed by a Facile Solution Based Process," IEEE Sensors Council Mechanical Sensors, vol. 3, No. 2, Feb. 2019 (4 pages).
Zhang, et al., "Novel Printed Carbon Nanotubes Based Resistive Humidity Sensors," IEEE 2019, Western Michigan University, Kalamazoo, Michigan (3 pages).
Ali et al., "Flexible Capacitive Pressure Sensor Based on PDMS Substrate and Ga—In Liquid Metal," IEEE Sensors Journal, vol. 19, No. 1, Jan. 1, 2019, pp. 97-104 (8 pages).
Zhang et al., "Design, Simulation and Fabrication of a Novel MEMS Based Pulsometer," MDPI Proceedings 2018, 2, 951; doi:10. 3390/proceedings2130951, published Dec. 3, 2018 (5 pages).
Ali et al., "Eutectic Ga—In Liquid Metal Based Flexible Capacitive Pressure Sensor," IEEE 978-1-4799-8287-5/16, 2016, Western Michigan University, Kalamazoo, Michigan (3 pages).
Atalay et al., "A Highly Sensitive Capacitive-Based Soft Pressure Sensor Based on a Conductive Fabric and a Microporous Dielectric Layer," Advanced Materials Technologies 2017, 1700237 DOI: 10.1002/admt.201700237 (8 pages).
Moorthi et al., "A novel flexible strain gauge sensor fabricated using screen printing," 2012 Sixth International Conference on Sensing Technology (ICST) 978-1-4673-2248-5/12 2012, Western Michigan University, Kalamazoo, Michigan (4 pages).
Emamian et al., "Fully Printed and Flexible Piezoelectric Based Touch Sensitive Skin," Western Michigan University, Kalamazoo, Michigan, 2015 IEEE, 978-1-4799-8203-5/15 (4 pages).
Emamian et al., "Screen printing of flexible piezoelectric based device on polyethylene terephthalate (PET) and paper for touch and force sensing application," Sensors and Actuators A 263 (2017) 639-647 http://dx.doi.org/10.1016/j.sna.2017.07.045 Jul. 24, 2017 (9 pages).
Zhao et al., "Flexible, Stretchable and Wearable Multifunctional Sensor Array as Artificial Electronic Skin for Static and Dynamic Strain Mapping," Advanced Electronic Materials 2015, 1, 1500142 DOI: 10.1002/aelm.201500142 (7 pages).

(56) References Cited

OTHER PUBLICATIONS

Su et al., "Mimosa-Inspired Design of a Flexible Pressure Sensor with Touch Sensitivity," Material Views 2015, 11, No. 16, 1886-1891 DOI: 10.1002/smll.201403036 (6 pages).

Pang et al., "Epidermis Microstructure Inspired Graphene Pressure Sensor with Random Distributed Spinosum for High Sensitivity and Large Linearity," ACS Nano 2018, 12, 2346-2354 DOI: 10.1021/acsnano.7b07613 (9 pages).

Santos et al., "Piezoresistive E-skin Sensors Produced with Laser Engraved Molds," Advanced Electronic Materials 2018, 4, 1800182 DOI: 10.1002/aelm.201800182 (10 pages).

Chlaihawi, et al. "Development of printed and flexible dry ECG electrodes," Sensing and Bio-Sensing Research 20 (2018) 9-15, May 3, 2018 (7 pages).

Shabaninezhad et al., "Theoretical Investigation of Size, Shape and Aspect Ratio Effect on the LSPR Sensitivity of Hollow-Gold Nanoshells," Department of Physics, Department of Chemistry, Western Michigan University, Kalamazoo, Michigan (25 pages).

Shabaninezhad et al., "Ultrafast Electron Dynamics in Thiolate-Protected Plasmonic Gold Clusters: Size and Ligand Effect," The Journal of Physical Chemistry 2019, 123, 13344-13353, May 6, 2019 DOI: 10.1021/acsjpcc.9b01739 (10 pages).

You et al., "A wearable piezocapacitive pressure sensor with a single layer of silver nanowire-based elastomeric composite electrodes," Journal of Materials Chemistry A, 2016, 4, 10435-10443, May 20, 2016; DOI: 10.1039/c6ta02449a (10 pages).

Yildirium et al., "Roll-to-Roll (R2R) Production of Ultrasensitive, Flexible, and Transparent Pressure Sensors Based an Vertically Aligned Lead Zirconate Titanate and Graphene Nanoplatelets," Advanced Materials Technologies 2019, 4, 1800425; DOI: 10.1002/admt.201800425 (10 pages).

Ko et al., "A Simple Silver Nanowire Patterning Method Based on Poly(Ethylene Glycol) Photolithography and Its Application for Soft Electronics," Scientific Reports, May 23, 2017; DOI:10.1030/s41598/s41598-017-02511-8 (9 pages).

Park et al., "Photolithography-Based Patterning of Liquid Metal Interconnects for Monolithically Integrated Stretchable Circuits," Applied Materials & Interfaces 2016, 8, 15459,15465; DOI: 10.1021/acsami.6b01896 (7 pages).

Liang et al., "Highly Sensitive, Flexible MEMS Based Pressure Sensor with Photoresist Insulation Layer," Small 2017, 13, 1702422; DOI: 10.1002/smll.201702422 (7 pages).

Ding et al., "Influence of the pore size on the sensitivity of flexible and wearable pressure sensors based on porous Ecoflex dielectric layers," Materials Research Express 6 (2019) 066304, Mar. 6, 2019; https://doi.org/10.1088/2053-1591/ab091a (8 pages).

Park et al., "A Flexible Capacitive Pressure Sensor for Wearable Respiration Monitoring System," IEEE Sensors Journal, vol. 17, No. 20, Oct. 15, 2017, pp. 6658-6564 (7 pages).

\* cited by examiner

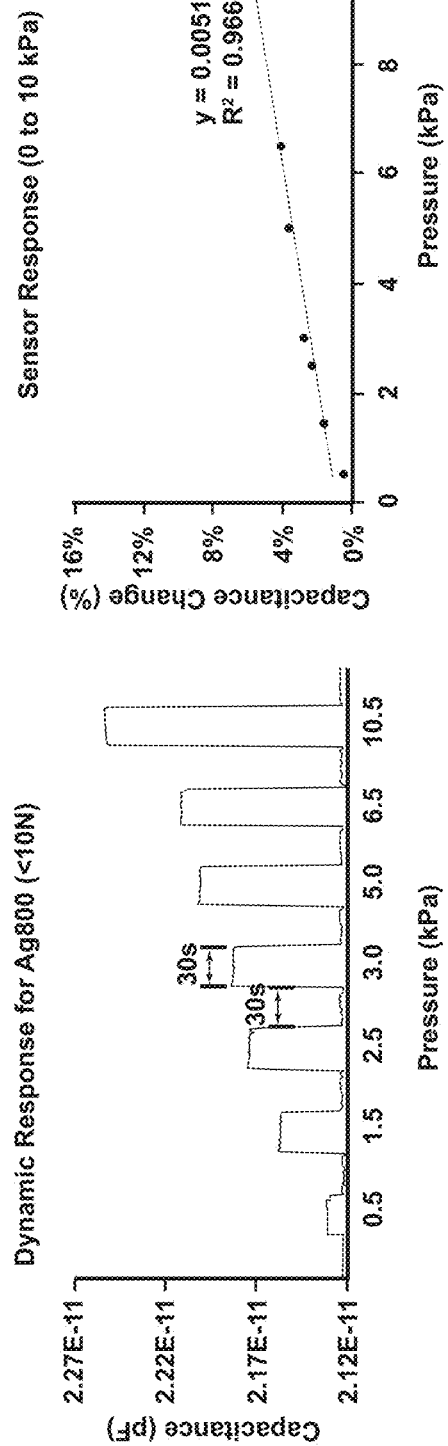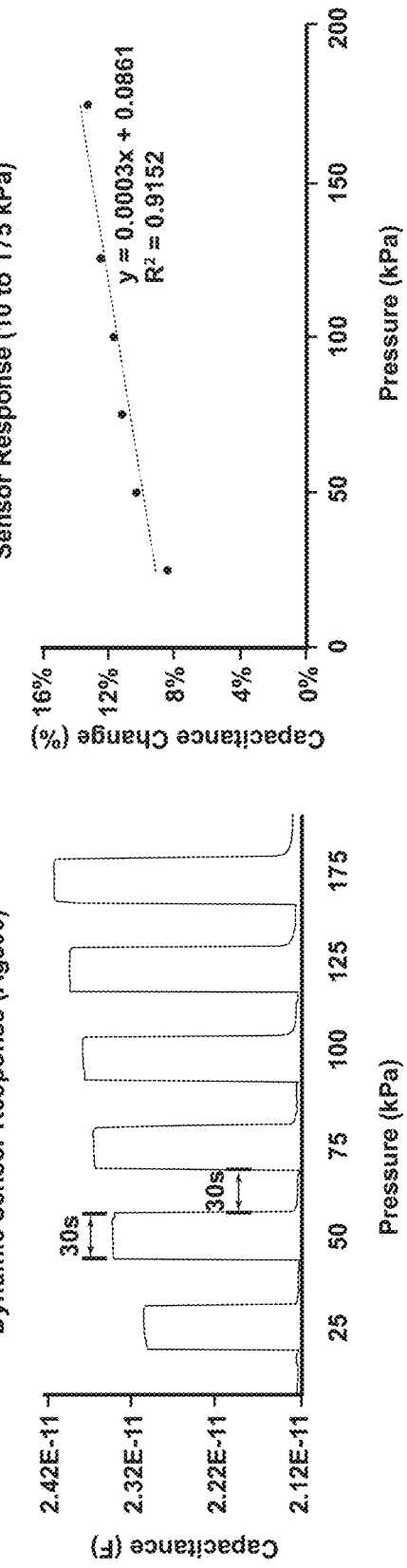
FIG. 6A
FIG. 6B
FIG. 6C
FIG. 6D

PRESSURE MONITORING SYSTEM FOR HELMETS

CROSS-REFERENCE TO RELATED APPLICATIONS

This application claims the benefit under 35 U.S.C. § 119(e) to U.S. Provisional Patent Application No. 62/860,286, filed Jun. 12, 2019, entitled "PRESSURE MONITORING SYSTEM FOR HELMETS," the entire contents of which is incorporated herein by reference in its entirety.

BACKGROUND OF THE INVENTION

Various types of protective articles such as helmets and pads have been developed. For example, protective helmets and pads worn on the body may be used by participants in athletic events such as football, hockey, etc. Protective helmets and other protective equipment may also be worn by individuals participating in other sports, such as downhill skiing, snowboarding, ice-hockey, wrestling, martial arts, and the like. Furthermore, motor vehicle operators (e.g. motorcycle and ATV operators) may also wear protective helmets and/or other protective items. Protective equipment can also include knee pads, shin guards, shoulder pads and the like.

Protective helmets may include a relatively hard, rigid outer shell, and resilient material (e.g. padding) on at least a portion of an inside of the helmet. The padding is configured to support the helmet on a user's head and to absorb impact.

BRIEF SUMMARY OF THE INVENTION

One aspect of the present disclosure is a pressure sensing system for measuring pressure between a user's body and a protective article worn by the user. The pressure sensing system may, optionally, be configured for use with a protective helmet, and may include a flexible sensing assembly (e.g. a cap or other wearable article) that is configured to fit between an inside surface of a protective article (e.g. a helmet or other protective item) and a user's body (e.g. a user's head, chest, shoulders, elbows, hips, knees, shins, etc.). The flexible sensing assembly/cap may comprise a thin fabric that may be flexible and stretchable. The flexible sensing assembly/cap includes a pressure sensor array comprising a plurality of pressure sensors. Each sensor may include a dielectric layer that is deformable in a thickness, a first electrode on a first side of the dielectric layer, and a second electrode on a second side of the dielectric layer. The second electrode is movable toward and away from the first electrode by deformation of the dielectric layer. The dielectric layer is configured to maintain a capacitance between the first electrode and the second electrode, and the capacitance changes with the movement of the second electrode toward or away from the first electrode. The system further includes a data acquisition module connected to the flexible sensing assembly (e.g. fabric cap), and a plurality of conductive lines operably interconnecting the pressure sensors to the data acquisition module. The data acquisition module may be configured to provide data from the pressure sensor array to a user interface device such as a computing device having a display and/or other capabilities for providing information to a user.

The pressure sensors may comprise a dielectric layer sandwiched between conductive layers. One or both conductive layers may be bonded to a fabric layer. One or both conductive layers may be bonded to a plurality of electrical conductors to provide an electrical connection therewith.

The dielectric layer of each pressure sensor may optionally be flexible between a planar condition and a non-planar condition. The system may optionally include a readout circuit that is electronically coupled with the first and second electrodes of the pressure sensors to measure a change in capacitance and to output a corresponding voltage. At least one of the first and second electrodes optionally comprises conductive ink that is disposed on a flexible base film. The flexible base film optionally comprises a polymer layer and a melt adhesive layer. Fabric may optionally be heat-bonded to the polymer layer by the melt adhesive layer.

The dielectric layer of each pressure sensor may comprise a porous (soft) polymer material such as a porous polydimethylsiloxane (PDMS). The porous PDMS may be fabricated using nitric acid ($HNO_3$) in a mixture of PDMS and sodium hydrogen bicarbonate ($NaHCO_3$) for inducing the liberation of $CO_2$ gas. The porous polymer dielectric material may provide increased sensitivity (change in capacitance) at a given pressure applied to the pressure sensor relative to solid (nonporous) polymer dielectric material. Although the dielectric material may comprise porous PDMS, virtually any dielectric material having sufficient flexibility may be utilized. For example, a soft, nonporous dielectric material providing sufficient change in thickness (and capacitance) at low applied pressures may be utilized.

The article may comprise a protective article (e.g. a helmet) or other protective item such as back plates and/or rib protectors and/or girdles and/or shoulder pads and/or hip pads and/or tail pads, or a limb prosthetic, orthopedic brace, etc. The fabric of the sensing assembly may optionally comprise a flexible fabric of a cap or other item that is configured to be positioned between a user's body and a protective or prosthetic article. The polymer layer of the flexible base film may optionally comprise thermoplastic polyurethane, and the dielectric layer may optionally comprise silicone elastomer material. One or more of the pressure sensors may optionally include a curved outer edge, and the curved outer edge may optionally be circular. One or more of the pressure sensors may optionally be about 1.0 inches to about 2.0 inches in diameter. The pressure sensor array may optionally comprise at least five pressure sensors or other suitable number capable of providing sufficient pressure data to determine if a helmet or other protective article fits comfortably according to predefined criteria. The flexible assembly may comprise a cap that may optionally include a chin strap that is configured to retain the cap on a user's head.

Another aspect of the present disclosure is a method of measuring pressure between a wearable article (e.g. a helmet or other protective article or a prosthetic device) and a user's head or other body part. The method includes positioning a flexible sensor assembly such as a cap having a plurality of capacitive pressure sensors on a user's head or other body part. A helmet or other protective article is positioned over the flexible assembly (e.g. cap) on the user's body part (e.g. head). Changes in the capacitance of the pressure sensors are utilized to determine the pressure between the user's body (e.g. head) and an inside of the protective article (e.g. helmet). The flexible assembly/cap may optionally be positioned on the user's body/head before the protective article/helmet is positioned over the flexible assembly/cap, or the flexible assembly/cap and the protective article/helmet may be positioned on a user's body/head at substantially the same time. The protective article/helmet may optionally be removed from the user's body/head without removing the flexible assembly/cap from the user's body/head, or the protective article/helmet and flexible assembly/cap may be removed at the same time.

Another aspect of the present disclosure is a method of fabricating a flexible sensor assembly such as a cap for sensing pressure on a user due to a wearable (e.g. protective) article such as a helmet, prosthetic device, etc. that is configured to be worn by a user. The method includes fabricating a plurality of thin flexible pressure sensors by forming first and second electrodes on opposite sides of a flexible dielectric material. The pressure sensors are secured to a thin flexible material. The thin flexible material may optionally comprise a fabric in the shape of a cap or other article that can be worn by a user. The pressure sensors may be secured to the thin flexible material either before or after the thin flexible material is formed into the shape of a cap or other wearable article.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 6A is a chart showing test results for a pressure sensor according to one aspect of the present disclosure;

FIG. 6B is a chart showing test results for a pressure sensor according to one aspect of the present disclosure;

FIG. 6C is a chart showing test results for a pressure sensor according to one aspect of the present disclosure;

FIG. 6D is a chart showing test results for a pressure sensor according to one aspect of the present disclosure;

DETAILED DESCRIPTION

Figure 1:
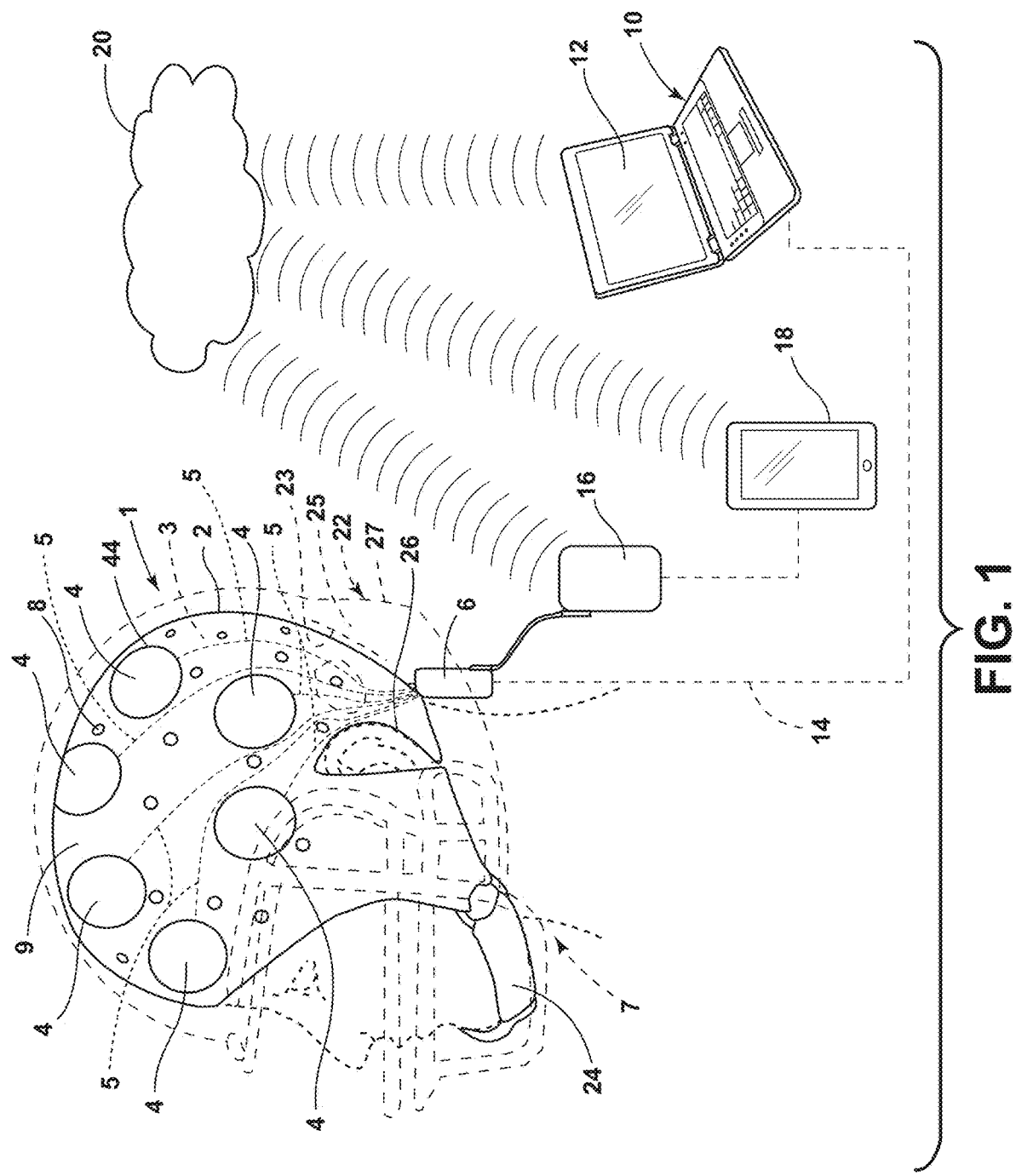
FIG. 1 is a partially schematic view showing a pressure sensing system according to one aspect of the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the system and components thereof may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

This patent application is related to U.S. Pat. No. 9,943, 128, entitled "HELMET IMPACT MONITORING SYSTEM," issued on Apr. 17, 2018, the entire contents of which is incorporated herein by reference.

With reference to FIG. 1, a pressure sensing system 1 according to one aspect of the present disclosure includes a flexible sensing assembly 2 that may be in the form of a cap or other wearable article that may be made from a thin flexible and/or stretchable fabric material 9 to fit closely around a body part such as a head 3 of a user 7 inside a wearable (e.g. protective) article such as a helmet 22 or other protective article. Inner surface 23 of helmet 22 may be formed by padding or other resilient material 25 disposed inside of an outer shell 27 of helmet 22. The flexible assembly/cap 2 may include a sensor array comprising a plurality of thin flexible pressure sensors 4 that are operably connected to a data acquisition module 6 by conductive lines 5. The data acquisition module 6 may be operably connected to a computing device such as a laptop 10 having a display 12 by a conductive line 14, or wirelessly (e.g. via a wireless communication unit 16). In general, the communication unit 16 may utilize wireless signals via a network 20 to communicate with laptop 10, a smartphone 18, and/or other devices (not shown).

The cap 2 or other wearable article is preferably made from a thin flexible and/or stretchable fabric 9 that fits closely around the head 3 (or other body part) of a user 7. The cap 2 may be made from virtually any suitable material, and the present disclosure is not necessarily limited to fabrics. If the wearable article comprises a cap 2, the cap 2 may include a chin strap 24 that retains the cap 2 on a user's head 3, and the cap 2 may also include ear openings 26. The cap 2 may also include a plurality of openings 8 to provide for ventilation. The cap 2 is preferably thin so that the cap 2 can fit comfortably between an inner surface 23 of a protective helmet 22 and the head 3 of a user, without significantly increasing the pressure at contact points between the user's head 3 and helmet 22. The thickness of the sensors 4 and fabric of cap 2 is preferably no more than about 0.100 inches, and more preferably less than about 0.020 inches. However, it will be understood that the present disclosure is not limited to any specific dimension or range of dimensions, and cap 2 and/or sensors 4 may have virtually any thicknesses, and may have non-uniform thickness. Although the left side of cap 2 is shown in FIG. 1, it will be understood that the cap 2 may be substantially symmetric about a center line, such that the right side of cap 2 (not shown) is substantially a mirror image of the left side shown in FIG. 1.

As discussed in more detail below, the sensors 4 comprise capacitive pressure sensors that generate pressure data that is processed by the computing unit 10, and the pressure results are shown on display 12. The cap 2 may be utilized by a person to try on different helmets 22 in an effort to find a helmet 22 that fits properly. In general, pressures in a range of 0 kPa to about 100 kPa may be considered to have a comfort fit. However, it will be understood that wider or smaller ranges may be utilized as criteria with respect to a comfort fit, and the present disclosure is not limited to a specific range. Alternatively, the pressure data from sensors 4 can be utilized to modify a shape/contour of inner surface 23 of helmet 22 to thereby custom fit a helmet 22 to a particular user to thereby ensure that the pressures meet the predefined comfort fit criteria. The pressure data from the sensors 4 can also be utilized to ensure proper fit of the helmet 22 to a particular user.

The cap 2 can also be utilized during development of prosthetic or protective articles (e.g. helmets 22) to determine an inner surface shape 23 of helmet 22 providing a best fit for a high percentage of users. For example, cap 2 may be utilized to measure the pressures resulting from a given helmet 22 when used for a plurality of different users, and the surface 23 may be adjusted to a contour that minimizes the average pressure for a maximum number of users.

Also, cap 2 may be worn by a user 7 during activities (e.g. sporting activities) to monitor impact forces. When utilized in this way, the data can be measured and processed in a manner substantially similar to the arrangement described in U.S. Pat. No. 9,943,128 entitled "HELMET IMPACT MONITORING SYSTEM." Impact forces may result in pressures (e.g. 6,000 kPa or greater) that are significantly higher than static pressures. Thus, sensors 4 may be configured to provide a wide range of pressure measurement capabilities (e.g. about 0 or 1.0 kPa to above about 6,000 kPa or more). Alternatively, cap 2 may include both lower pressure sensors 4 as described herein (e.g. about 0 or 1.0 kPa to about 100 kPa), and higher pressure impact sensors (e.g. at least about 100 kPa to about 6,000 kPa or more). Above-referenced U.S. Pat. No. 9,943,128 discloses pressure sensors suitable for measuring higher pressures resulting from impacts.

Figure 2:
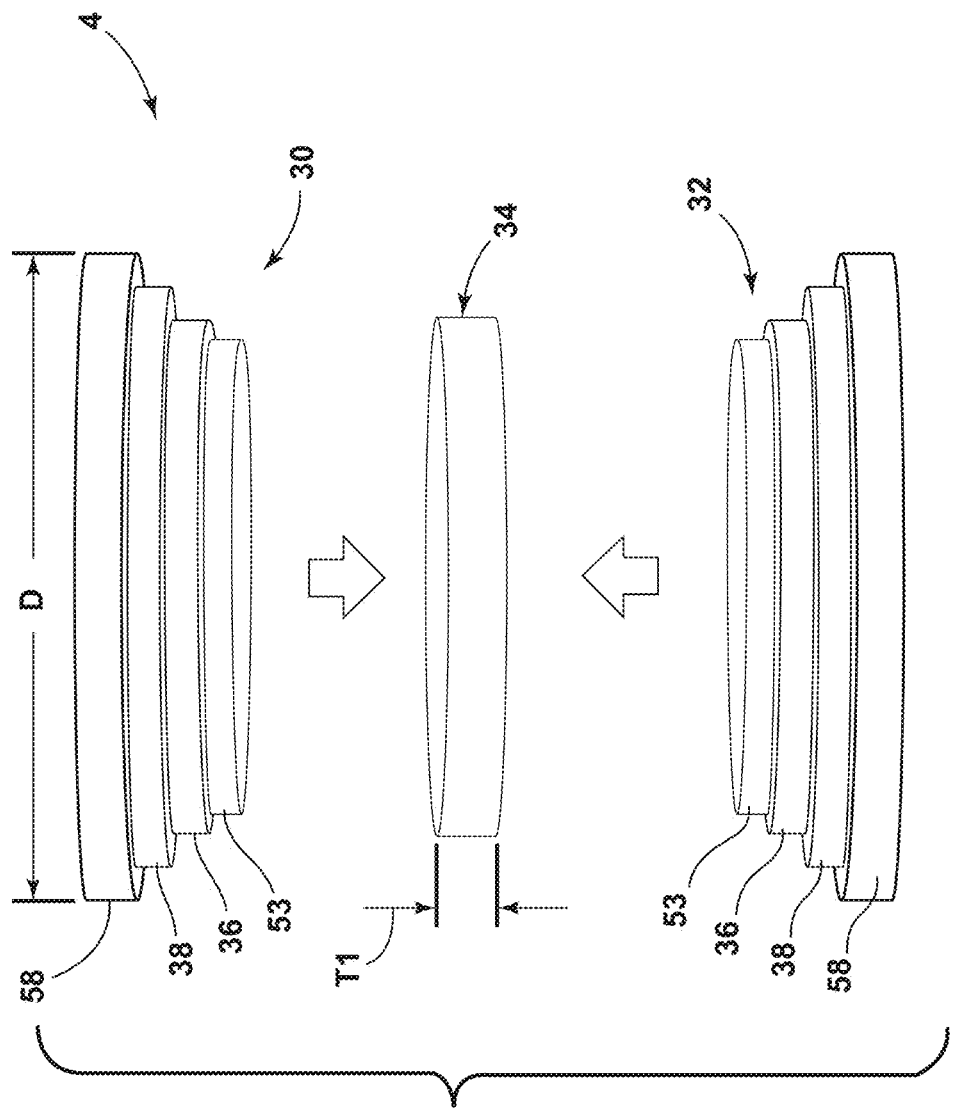
FIG. 2 is a partially schematic exploded perspective view of a pressure sensor according to one aspect of the present disclosure.
Figure 3:
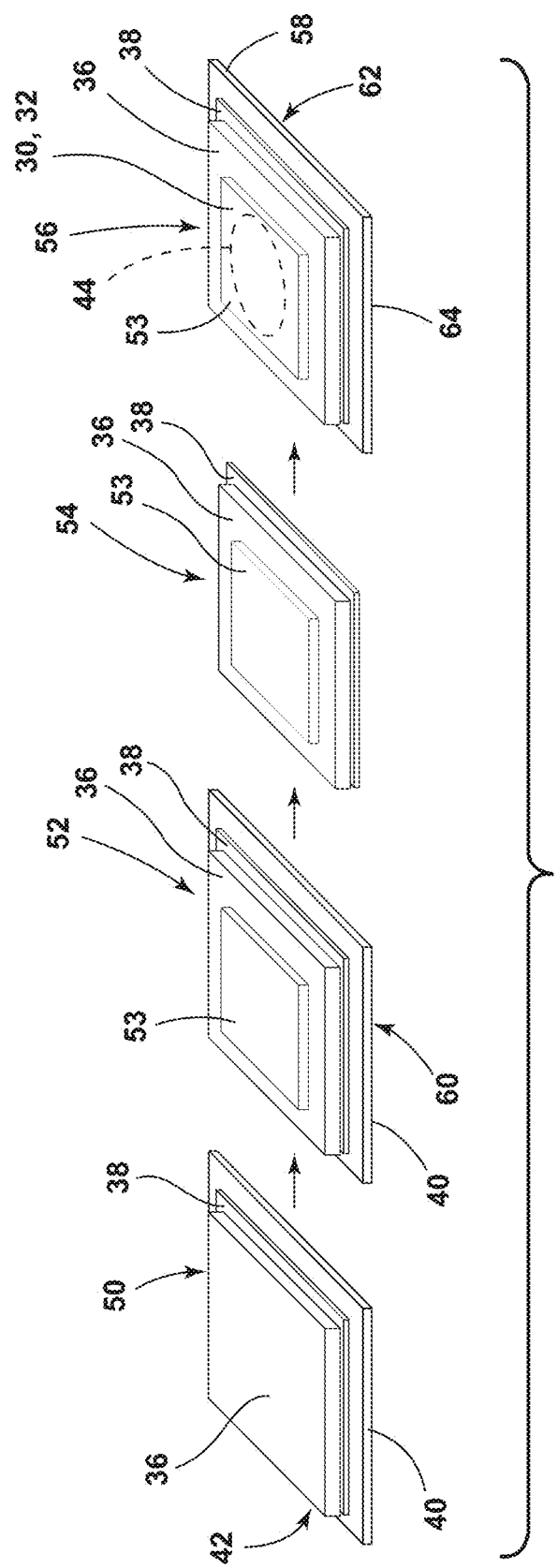
FIG. 3 is a partially schematic perspective view showing fabrication of a pressure sensor.

With reference to FIG. 2, each sensor 4 may comprise a dielectric layer 34 that is disposed between first and second electrodes 30 and 32. It will be understood that the thicknesses of the various components (layers) shown in FIG. 2 are exaggerated, and the actual thicknesses of the components may be thinner relative to the overall size of the components. As discussed in more detail below in connection with FIG. 3, electrodes 30 and 32 may comprise Ag (silver) ink 53 that is printed on a thermoplastic polyurethane (TPU) 36 of a flexible base film 42 (FIG. 3) or directly onto fabric 58. The flexible base film comprises a TPU layer 36 which may have a thickness of about 50-100 μm, a melt adhesive layer 38 (preferably 20-50 μm), and a temperature stable carrier film 40 (FIG. 3). Flexible base film 42 may comprise a commercially available INTEXAR® TE-11C available from DuPont Corporation of Wilmington, Del., or other suitable material. The dielectric layer 34 may comprise a SYLGUARD® 184 silicone elastomer available from Dow Corning of Midland, Mich. or other suitable dielectric material. The dielectric layer 34 may be formed by mixing liquid PDMS pre-polymer with a curing agent at a ratio of 10 to 1, and the liquid PDMS may then be poured into a mold to form layers by thermally curing the PDMS at a required time and temperature (e.g. 130° C. for 15 minutes). It will be understood that this is merely an example of a suitable material and process, and dielectric layer 34 may be formed utilizing virtually any suitable material utilizing any suitable process. As discussed in more detail below, the PDMS dielectric material of layer 34 may be porous (soft) to provide greater changes in capacitance at a given applied pressure to thereby permit accurate measurement of low applied pressures. The dielectric layer 34 may have a thickness "T1" of about 1 mm (i.e. 0.0394 inches). However, the thickness T1 may be greater or smaller than 1 mm, and the present disclosure is not limited to any specific dimension. For example, the thickness T1 may be about 0.5 mm-about 1.5 mm (about 0.0197 inches-about 0.0591 inches), about 0.5 mm-about 5.0 mm (about 0.0197 inches-about 0.1969 inches), about 0.1 mm-about 10.0 mm (about 0.00394 inches-about 0.3937 inches), or any other suitable thickness.

In the illustrated example, the sensor 4 has a diameter "D" of about 37 mm (i.e. about 1.5 inches). However, the diameter D may be significantly larger or smaller as required for a particular application. For example, the diameter D may vary from about 25 mm to about 51 mm (about 1 inches to about 2 inches). Although all sensors 4 may have the same size and shape, the sensors utilized for a cap 2 may, alternatively, have different sizes and shapes. Also, the edges 44 (FIG. 3) of the sensors 4 may be curved (e.g. circular) as shown, or the sensors 4 may have virtually any other shape. The sensors 4 may be evenly, or approximately evenly, spaced from each other, or the sensors may be spaced in an uneven pattern. Also, although the layers 36, 38, 40 and electrodes 30 and 32 are shown as having different diameters in FIG. 2, it will be understood that all of the layers (including dielectric layer 34) of sensor 4 may have substantially the same diameter "D." Cap 2 may include any number of sensors 4 in any pattern or configuration. Typically, 10, 12, 14, or 16 (or more) sensors may be utilized. However, fewer sensors 4 may also be utilized. For example, cap 2 could have a single sensor 4 that may be utilized if pressure at a single point or region is to be measured. Typically, cap 2 may include at least five sensors 4.

Figure 4:
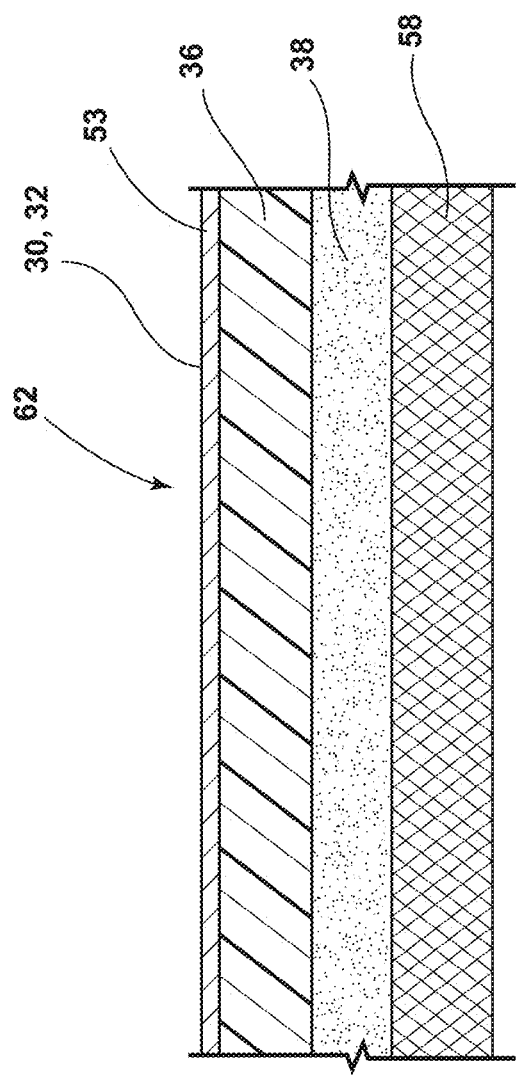
FIG. 4 is a fragmentary cross-sectional view of a pressure sensor according to one aspect of the present disclosure.

FIG. 3 is a schematic showing fabrication of sensors 4 according to one aspect of the present disclosure. It will be understood that FIGS. 3 and 4 are representative examples, and the present disclosure is not limited to these examples. For example, the present disclosure is not limited to the specific materials and sequences of steps described herein. During a first step 50 (FIG. 3), the flexible base film 42 (including TPU layer 36, melt adhesive 38, and carrier 40) is preheated as required to provide heat stabilization. Although the time and temperature may vary as required, the flexible base film 42 may be heated at 140° C. for about 30 minutes.

During a second step 52, a temporary subassembly 60 is formed by screen printing silver ink 53 on preheated TPU layer. The subassembly 60 is then cured at an elevated temperature (e.g. about 130° C.) for a suitable time (e.g. about 15 minutes) in an oven or other suitable manner.

During a third step 54, the carrier film 40 is removed from subassembly 60 to expose the adhesive layer 38. During a fourth step 56, the adhesive 38 is secured to fabric 58 by heat pressing the components together for a suitable period of time (e.g. about 15 to about 30 seconds). It will be understood that virtually any suitable adhering material and process may be utilized, and the present disclosure is not limited to the times, materials, and processes described herein.

In the illustrated example, the subassembly 62 has a substantially rectangular perimeter 64. However, other shapes and configurations may also be utilized. The subassembly 62 may be cut to form a curved (e.g. circular) perimeter 44 utilizing a suitable cutting process. For example, the subassembly 62 may be cut to form perimeter 44 utilizing a laser cutting system. Perimeter 44 may have virtually any shape (including non-circular shapes) and size as required for a particular application. The subassemblies 62 may then be adhesively bonded to opposite sides of dielectric layer 34 (FIG. 2) with the fabric 58 being adhesively bonded to the dielectric material 34 (see also FIG. 4). Fabric 58 may be adhesively bonded to fabric 9 of cap 2. Alternatively, cap 2 may be fabricated from fabric 58, and sensors 4 may be integrally formed with cap 2 by heat bonding TPU 36 directly to cap fabric 9 using adhesive 38 during step 56 (FIG. 3). Alternatively, cap 2 may comprise two layers of fabric 9 that are bonded to the TPU layers 36 using adhesive 38, with the sensor 4 disposed between the fabric layers 9. Similarly, fabric 58 on opposite sides of sensor 4 may be bonded to layers of fabric 9 using adhesive 38 or other suitable material or technique.

Figure 5A:
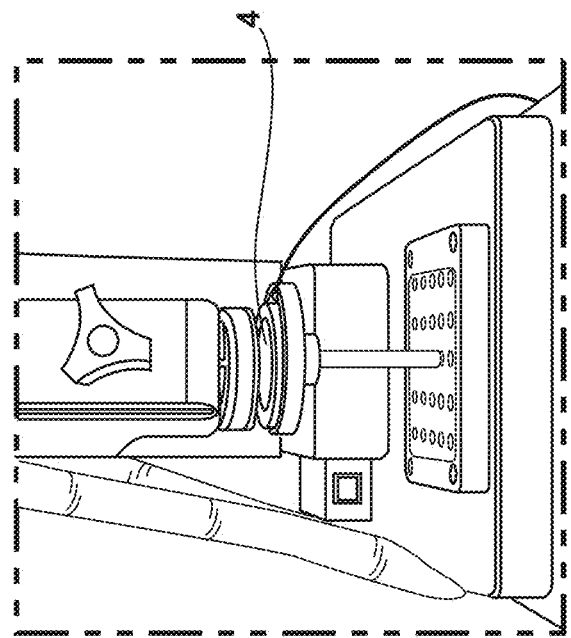
FIG. 5A is an enlarged view of a portion of the test setup of FIG. 5.
Figure 5:
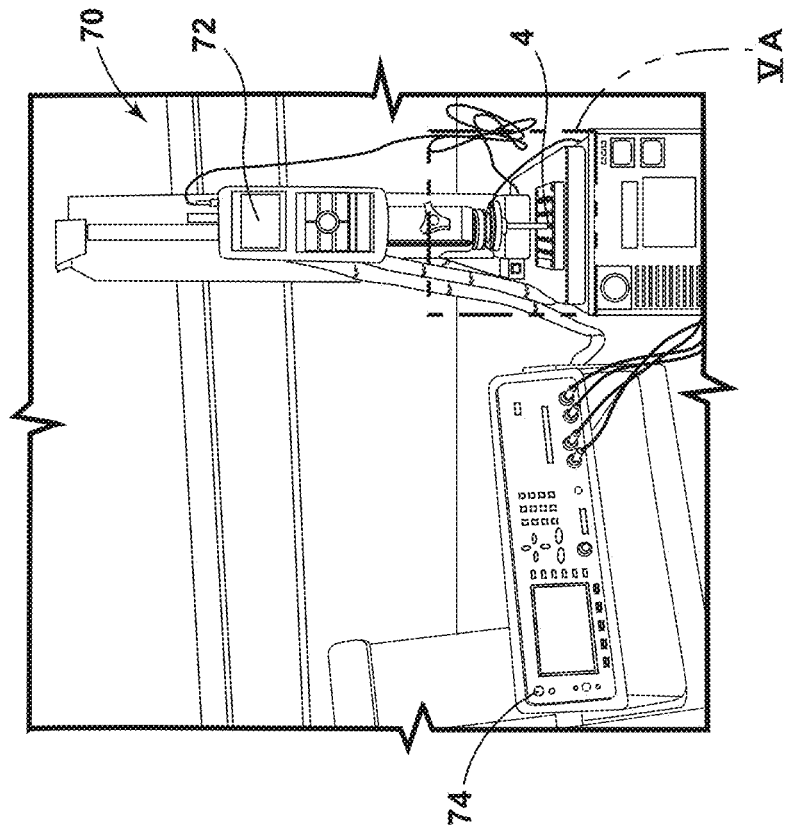
FIG. 5 is a partially fragmentary perspective view showing a test setup utilized to test pressure sensors according to one aspect of the present disclosure.

In general, a comfortable fit may be quantified to be within a pressure range of about 0 kPa (or about 1 kPa) to about 100 kPa. Higher pressures (e.g. about 110 kPa, about 120 kPa, etc.) may also be utilized to define the upper limit of the comfort fit range. Similarly, lower pressures (e.g. about 60 kPa, about 70 kPa, about 80 kPa, about 90 kPa, etc.) may also be utilized to define the upper bound of the comfort fit range. Also, the lower bound of the comfort fit range may comprise pressures above zero (e.g. about 5 kPa, about 10 kPa, about 15 kPa, about 20 kPa, etc.). Thus, the present disclosure is not limited to a specific comfort fit range, and virtually any suitable predefined comfort fit criteria may be utilized. During testing, test sensors 4 were therefore characterized in two pressure ranges: 1) a lower pressure range (about 0 kPa to about 10 kPa); and 2) a higher pressure range (about 25 kPa to about 100 kPa). An experimental test setup is shown in FIGS. 5 and 5A. The test sensors 4 were fabricated according to the process described above in connection with FIG. 4. With reference to FIG. 5, the test setup 70 included a motorized test stand with force gauge 72 and a precision LCR meter 74. In the illustrated example, the force gauge comprised a Mark-10 model M5-200, the movable platform comprised a Mark-10 ESM 301 motorized test stand, and the LCR 74 comprised an Agilent E4980A. The capacitive response of test sensor 4 was then tested by applying varying compressive forces perpendicular to each test sensor 4. Each test sensor 4 was initially tested from 0 kPa to 10 kPa, and then from 25 kPa to 175 kPa (i.e. greater than 100 kPa) to verify the sensitivities in lower and higher comfort fit pressure ranges (and above the maximum value of the comfort range). The change in capacitance was measured using a custom built LabVIEW™ program on a PC (e.g. laptop 10) connected to the LCR meter 74 via a USB cable or using any wireless methods of data transmission such as Bluetooth, ZigBee, Wi-Fi, and the like. The present disclosure is not limited to the specific sensors 4 and cap 2 as described herein, and any suitable sensors, wearable article, and method may be utilized.

In general, the capacitance of a fully printed test sensor 4, which is similar to a parallel plate capacitor, is inversely proportional to the thickness T1 (FIG. 2) of the dielectric layer 34. FIG. 6A shows the dynamic capacitive response of a test pressure sensor 4 at compressive forces varying from 0 kPa to 10 kPa, which is the lower comfort fit pressure range. Initially, the capacitance of the test pressure sensor 4 was recorded for 30 seconds with no force applied. The test sensor 4 was then subjected to a minimum detectable pressure of 0.2 kPa for 30 seconds, after which the compressive force was released. The response of the test sensor 4 was again recorded for another 30 seconds. This cycle was continued for increasing compressive forces up to 10.5 kPa.

With reference to FIG. 6C, the dynamic capacitive response of the test pressure sensor 4 at compressive forces varying from 25 kPa to 175 kPa (>100 kPa), which is a higher comfort fit pressure range was also tested. During testing, it was observed that the test sensor 4 was reversible, after each compressive force was released, due to the fact that the capacitance always attained its base capacitance value. In the illustrated example, the base capacitance value was 21±0.01 pF.

FIGS. 6B and 6C show the change in capacitance at different compressive forces varying from 0 kPa to 10.5 kPa and from 25 kPa to 175 kPa, respectively. A 0.50%, 1.60%, 2.34%, 2.78%, 3.60%, 4.09% and 6.01% change in capacitance was observed as the pressure increased from 0.5 kPa to 1.5 kPa to 2.5 kPa to 3.0 kPa to 6.5 kPa to 10.5 kPa, respectively. In addition, a 8.61%, 10.46%, 11.36%, 11.91%, 12.72% and 13.48% change in capacitance was observed as the pressure increased from 25 kPa to 50 kPa to 75 kPa to 100 kPa to 125 kPa to 175 kPa, respectively. These responses can be attributed to the shortening of the distance between the electrodes due to the application of the varying compressive forces. The results obtained demonstrated a sensitivity of 0.5%/kPa and 0.03%/kPa for the printed test pressure sensor 4 in the 0 kPa to 10 kPa and 25 kPa to 175 kPa pressure ranges, respectively. The porous dielectric material described in more detail below in connection with FIGS. 7-18 may be utilized. In general, a softer porous dielectric material provides greater changes in capacitance for a given load (e.g. at pressures ranging from about 0 kPa to about 100 kPa.

The pressure sensing system 1 of the present disclosure provides a way to quickly and accurately measure the pressure resulting from a helmet 22 (FIG. 1) when the helmet 22 is worn by a user 7. The system 1 may be utilized to determine if a specific helmet 22 fits a user (i.e. meets predefined comfort/pressure criteria). It will be understood that the predefined comfort/pressure criteria described above (0 or 1 kPa-100 kPa) is merely an example of a predefined comfort/pressure criteria. For example, the predefined comfort fit criteria (range) may include pressures above or below 100 kPa (e.g. 80 kPa, 90 kPa, 110 kPa, 120 kPa, etc.). Also, some sensors 4 of the array could have different construction (e.g. different materials and/or different material thicknesses). This could be done to, for example, provide for measuring pressures in different ranges. The system 1 may also be utilized to determine if the inner surface 23 of a helmet 22 needs to be modified to thereby provide a more comfortable fit. The system 1 may also be utilized to develop production helmets fitting the widest range of users based on pressure measurements taken when a helmet is worn by numerous different users.

It will be understood that the present disclosure is not limited to a cap 2 and helmet 22 as described herein. Virtually any type of wearable article or equipment may be fabricated to include pressure sensors 4. The wearable article may comprise thin, flexible and/or stretchable material (e.g. fabric) with one or more pressure sensors 4 secured thereto, and the wearable article may be utilized to measure pressure between a part of a user's body and a protective article. For example, sensors 4 may be incorporated into flexible footwear (e.g. socks) that sense pressure between a user's foot and a protective article such as a shoe, boot, ice skate, ski boot (cross country or downhill), ankle brace, foot brace, etc. Similarly, sensors 4 may be incorporated into thin flexible wearable articles such as shirts and/or pants to detect pressure between protective leg and/or shoulder "pads" of the type worn during football, hockey, and/or other sports or activities. Still further, sensors 4 may be incorporated into flexible (e.g. fabric) articles configured to be worn on an elbow or knee, and elbow or knee protectors may be worn over the flexible article. Still further, sensors 4 may be utilized in wearable articles that are configured to be utilized in clinical applications to ensure proper fit of limb prosthetics, orthopedic braces and the like. The wearable articles may also be used to measure forces transmitted to a user's body during use of limb prosthetics, orthopedic braces, and other such items. In each case, sensors 4 may be utilized to sense pressure between an article and a user's body to provide a proper fit. Sensors 4 may also be utilized during use to detect changes in pressure resulting from user movement and/or impacts to the wearable (protective or prosthetic) article while it is worn by a user.

Figure 7:
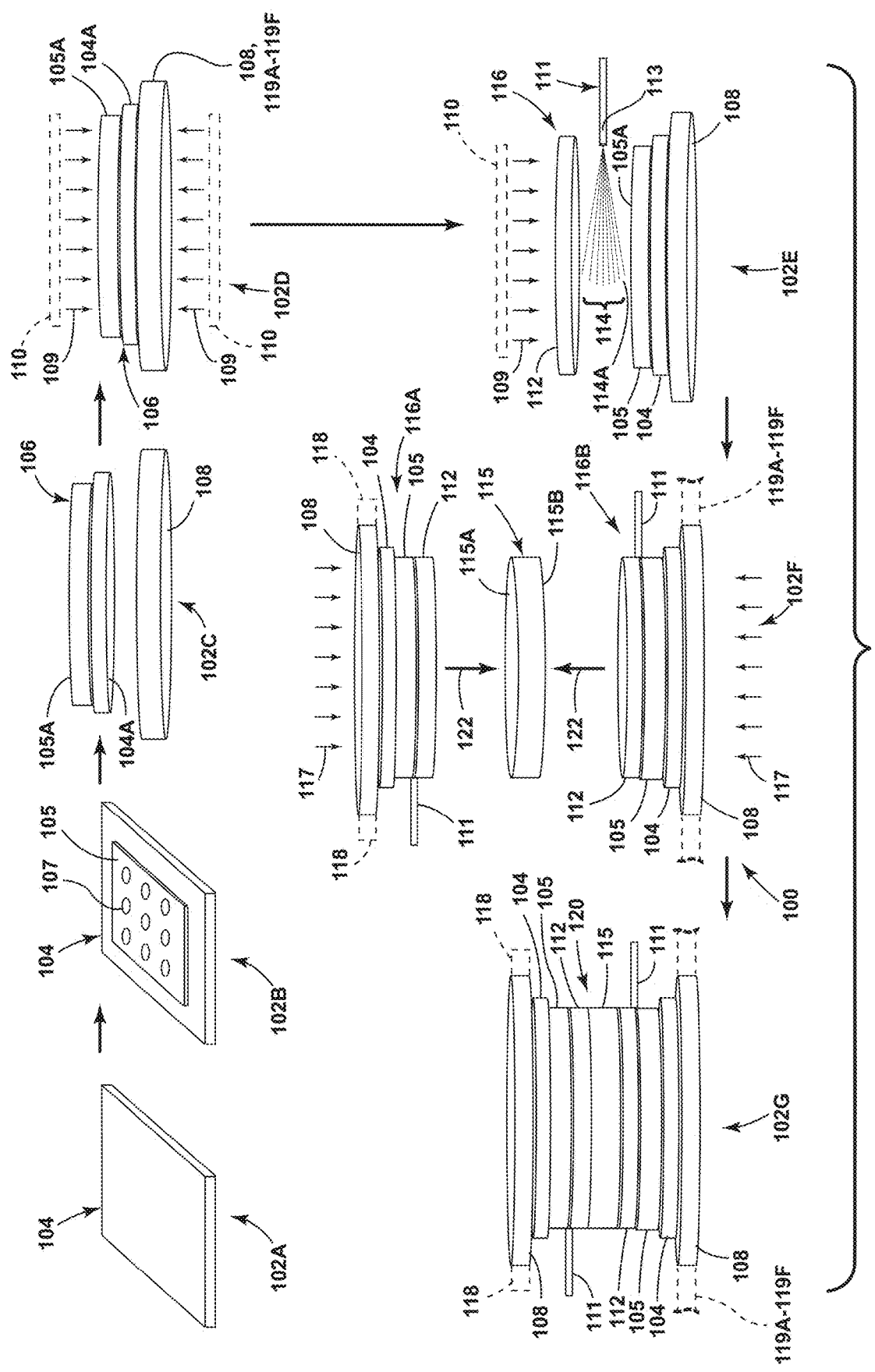
FIG. 7 is a schematic showing a process of fabricating pressure sensors according to another aspect of the present disclosure.

With reference to FIG. 7, a method of fabricating pressure sensors according to another aspect of the present disclosure includes steps 102A-102G. A substrate 104 is provided at step 102A. Substrate 104 may comprise a sheet of thermoplastic polyurethane (TPU) or other suitable material. Substrate 104 is preferably thin (e.g. 010 inches-0.050 inches) and sufficiently flexible to readily conform to a curved surface of a human body (e.g. a head, arm, leg, etc.). However, thicker or thinner sheets may be utilized, and substrate 104 could be rigid. At step 102B, a layer of conductive material 105 is formed on the substrate 104. The conductive layer 105 may comprise metal (e.g. silver) or other suitable conductive material. The substrate 104 and conductive layer 105 may be cut at 107 by use of a laser cutter or other suitable technique to provide a plurality of subassemblies 106 as shown at step 102C. The subassemblies 106 may include individual substrates 104A and conductive layers 105A that are circular or other shape as required for a particular application. In general, each individual substrate 104A may optionally have the same size and shape as the conductive layers 105A to which it is attached. However, a subassembly 106 may comprise a substrate 104A and a conductive layer 105A having dissimilar sizes and shapes.

At step 102D, the subassembly 106 is positioned adjacent fabric 108, and the substrate 104A is heat press laminated to fabric 108 utilizing heat and pressure (arrows 109) utilizing heated plates 110 or other suitable laminating tool or process. As discussed in more detail below, the fabric 108 may comprise a small piece of fabric having a size and shape that is similar to (or somewhat larger) than subassembly 106 (e.g. circular), or the fabric 108 may comprise a larger piece of fabric that is utilized to form a flexible cap or other item configured to fit closely against or around a body part of a subject.

At step 102E, a layer of thermoplastic polymer material 112 (e.g. TPU) is heat-laminated (adhered) to the conductive layer 105 using heated plate 110 to provide heat and pressure (arrows 109) to secure conductive strands 114 of wire 111 to the conductive layer 105 to form an electrode subassembly 116. TPU 112 thereby acts as a hot melt adhesive. Wire 111 preferably includes a plurality of conductive strands 114A and an insulated sheath 113. The individual strands 114A are preferably spaced apart across the surface 105A (see also FIG. 8) to thereby ensure that the strands 114 of wire 111 are mechanically secured to the conductive layer 105, while also ensuring a strong electrical connection between the strands 114 of wire 111 and the conductive layer 105.

At step 102F, first and second electrode subassemblies 116A and 116B (produced by steps 102A-102E) are adhesively bonded to opposite sides 115A and 115B of a dielectric material 115 utilizing adhesive PDMS or other suitable adhesive. As discussed in more detail below, the dielectric material 115 may comprise a porous PDMS or other suitable material. Force (arrows 117) may be applied to the electrode subassemblies 116A and 116B to adhesively bond the electrode subassemblies 116A and 116B to the opposite sides 115A, 115B of dielectric material 115 to thereby form a pressure sensor 120 as shown at step 102G.

Figure 8:
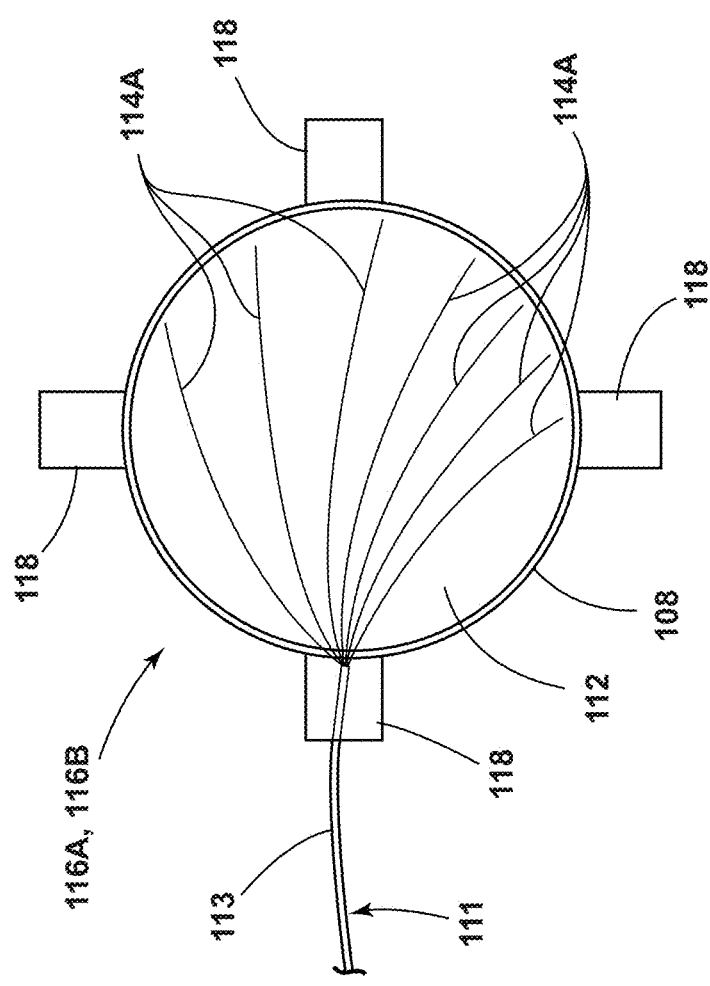
FIG. 8 shows a flexible electrode with permanent wiring.

With reference to FIG. 8, one or both of the electrode subassemblies 116A, 116B may include a layer of fabric 108 having a plurality of connectors such as tabs 118 that may be formed by cutting (e.g. laser cutting, knife, etc.) a sheet of fabric. As discussed in more detail below, the tabs 118 may be utilized to secure the pressure sensor 120 to a larger sheet of fabric (e.g. by sewing or other suitable technique). It will be understood that tabs 118 are optional.

Figure 9:
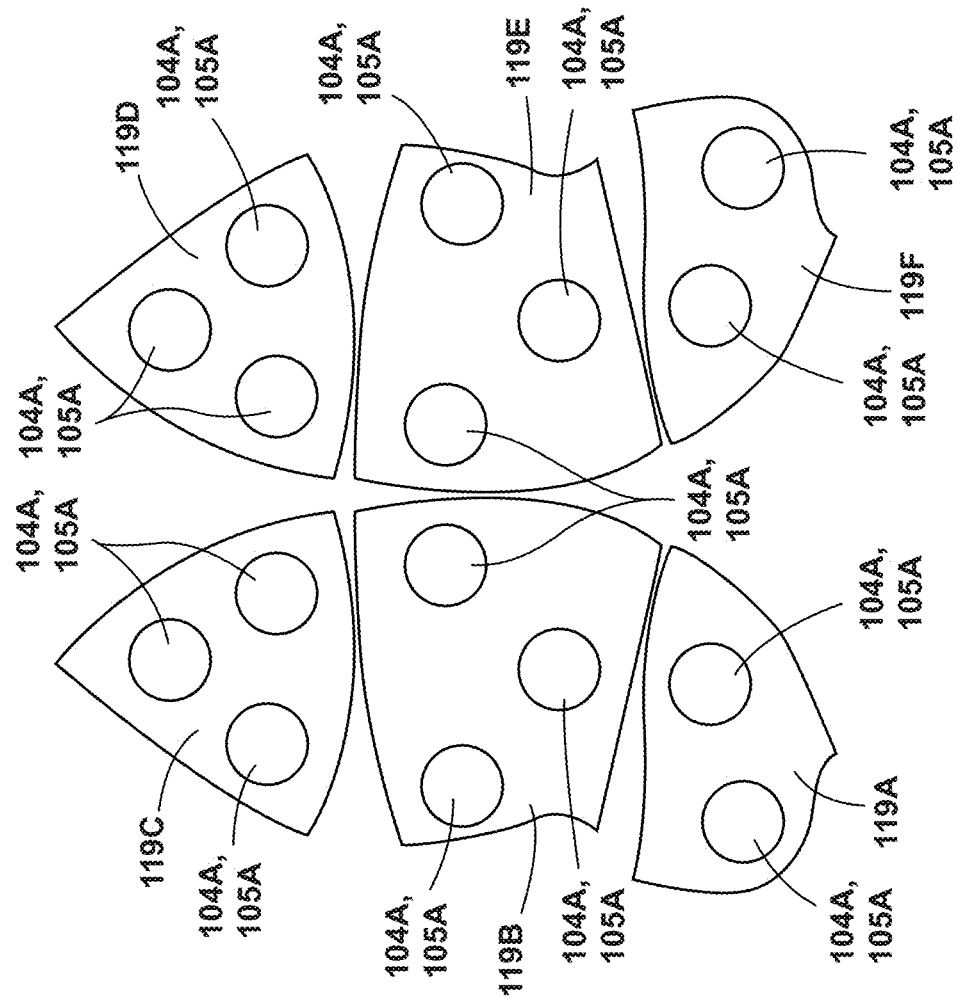
FIG. 9 shows electrodes attached to pieces of fabric.
Figure 10:
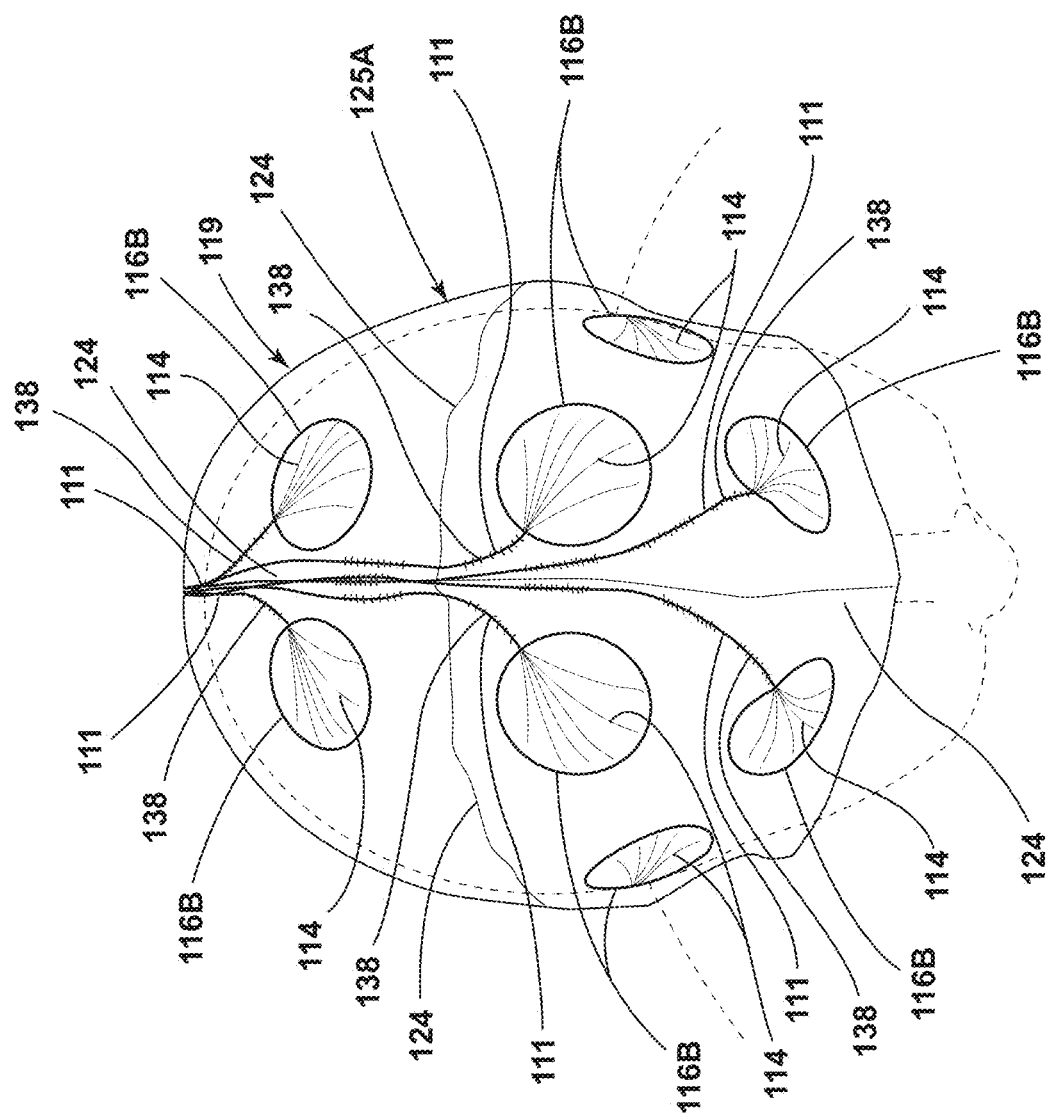
FIG. 10 is an isometric view of a cap subassembly.

With reference to FIG. 9, conductive layers 105A may be heat laminated to larger pieces of fabric 119A-119F utilizing heat lamination (step 102D) as described above in connection with FIG. 7. Fabric pieces 119A-119F are subsequently connected along seams 124 to form a layer of fabric 119 of a cap subassembly 125A as shown in FIG. 10. Seams 124 may be sewn or formed by other suitable techniques. Thus, the heat press laminating step 102D (FIG. 7) may comprise laminating the conductive layers 105A of each bottom electrode 116B to larger pieces of fabric 119A-119F as shown in FIG. 9. Strands 114 of wires 111 (FIG. 10) can be heat-laminated to the substrates 105A utilizing step 102E of FIG. 7 to form bottom electrodes 116B as shown in FIG. 10. Strands 114 of wires 111 may be bonded to conductive layers 105A prior to interconnecting fabric pieces 119A-119F together along seams 124 (i.e. strands 114 may be bonded to conductive layers 105A and wires 111 may be sewn to fabric pieces 119A-119F when fabric pieces 119A-119F are separate as shown in FIG. 9). The fabric pieces 119A-119F can then be sewn together along seams 124 to form a subassembly such as cap subassembly 125A (FIG. 10). Wires 111 can be secured to the fabric pieces 119A-119F by sewing (threads 138) or other suitable attachment technique. It will be understood that virtually any size and shape of fabric pieces may be used, and the present disclosure is not limited to forming a cap. Rather, fabric pieces 119A-119F and cap subassembly 125A are merely examples of one possible configuration. Also, a single piece of fabric may be utilized in some applications rather than individual pieces 119A-119F.

Figure 11:
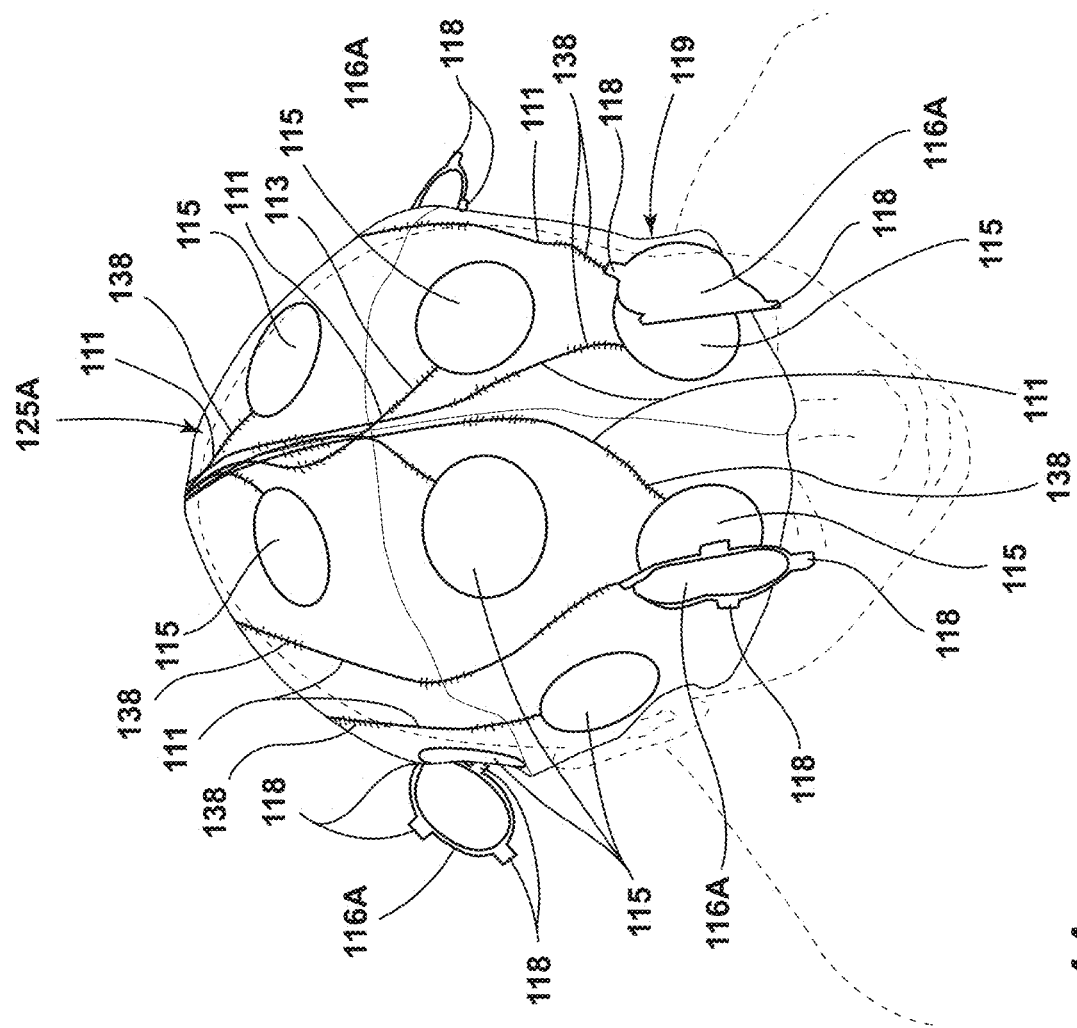
FIG. 11 is an isometric view of a cap subassembly.
Figure 12:
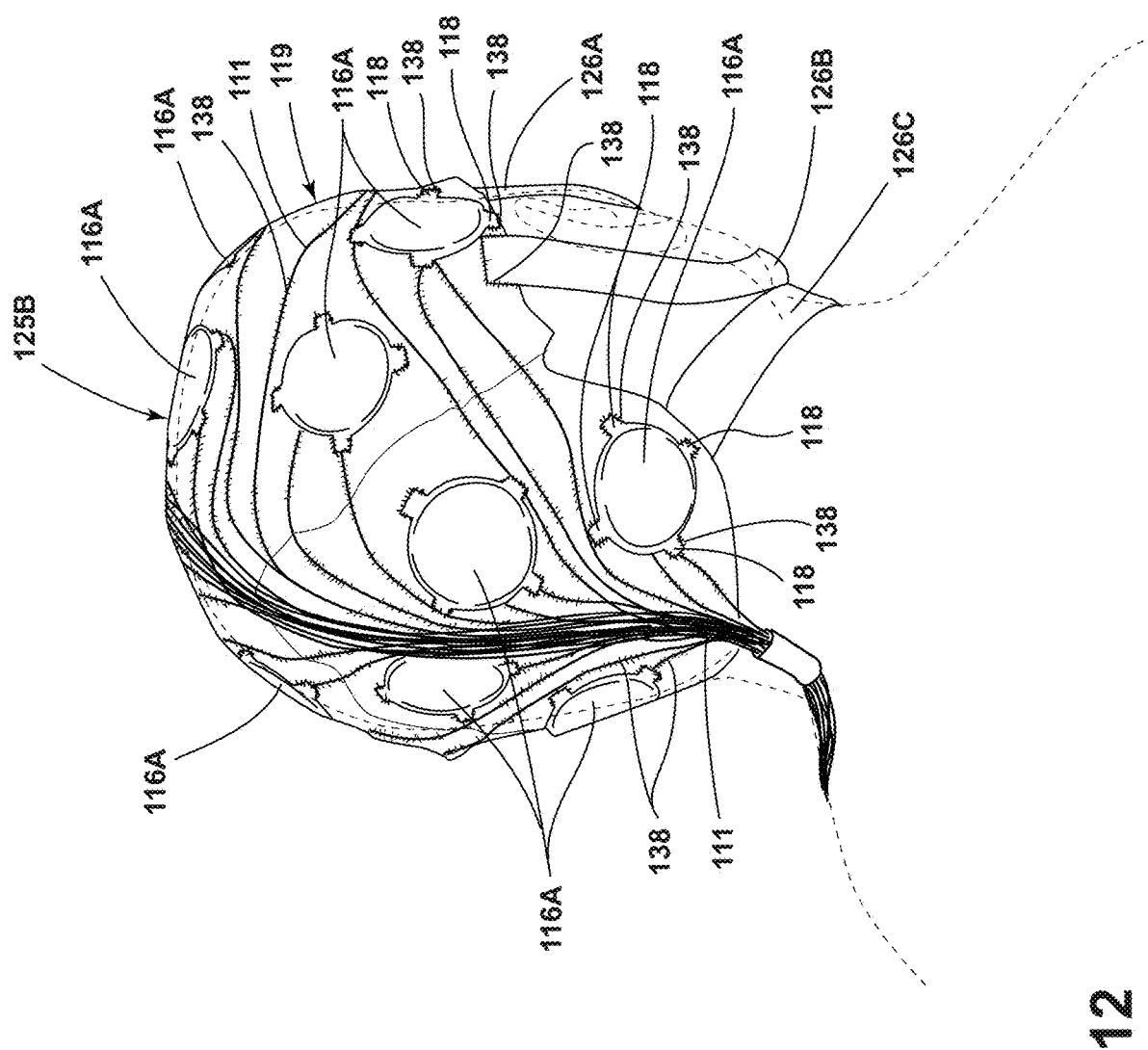
FIG. 12 is an isometric view of a cap subassembly.
Figure 13:
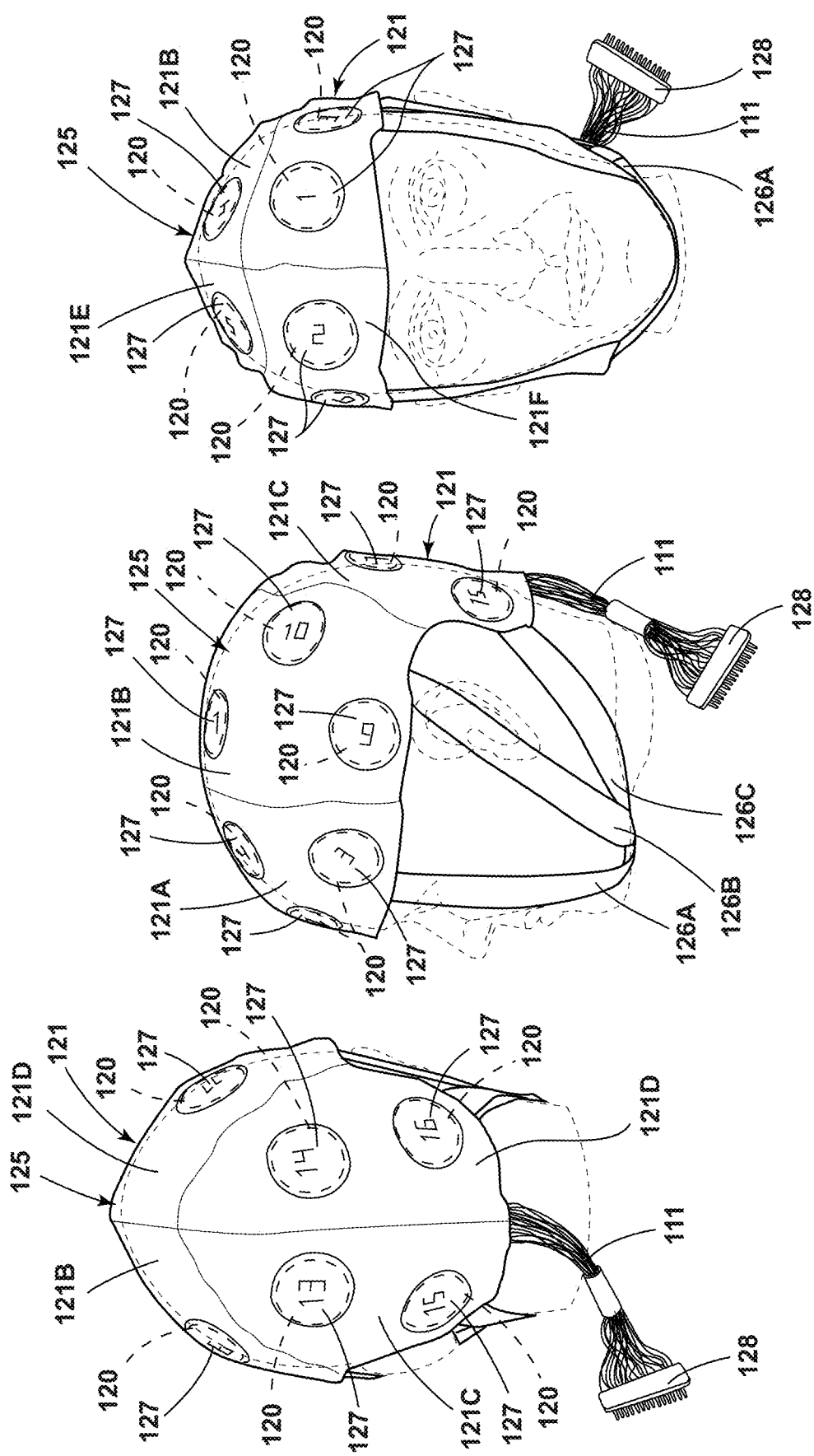
FIG. 13A is an isometric rear view of a cap and sensor arrangement.
FIG. 13B is an isometric side view of the cap and sensor arrangement of FIG. 13A.
FIG. 13C is an isometric front view of the cap and sensor arrangement of FIG. 13A.

With reference to FIG. 11, the dielectric material 115A may be adhesively bonded to the electrode subassemblies 116B, and top electrodes 116A may be adhesively bonded to the dielectric material 115. This may be accomplished utilizing the process described above in connection with step 102F of FIG. 7. As shown in FIG. 12, the tabs 118 of upper electrode subassemblies 116A may be sewn or otherwise attached to the fabric layer 119 (pieces 119A-119F) using thread 138 to secure the top electrode subassemblies 116A.

However, it will be understood that tabs 118 are optional. One or more straps 126A-126C may be secured to selected ones of the fabric pieces 119A-119F (e.g. by sewing with threads 138) to form a second cap subassembly 125B.

With further reference to FIG. 13A-13C, additional pieces of fabric 121A-121F may be sewn to the fabric layer 119 (fabric pieces 119A-119F) to form an outer layer of fabric 121 that covers sensors 120. Indicia 127 may be printed or otherwise marked on the fabric pieces 121A-121F to signify the location and number of each sensor 120. The wires 111 may be operably connected to a connector 128 to thereby permit the cap 125 to be electrically connected to one or more electronic devices (FIG. 1) such as a data acquisition module 6, communication signal 16, laptop 10, smartphone 18, and/or other devices (not shown).

Figure 14:
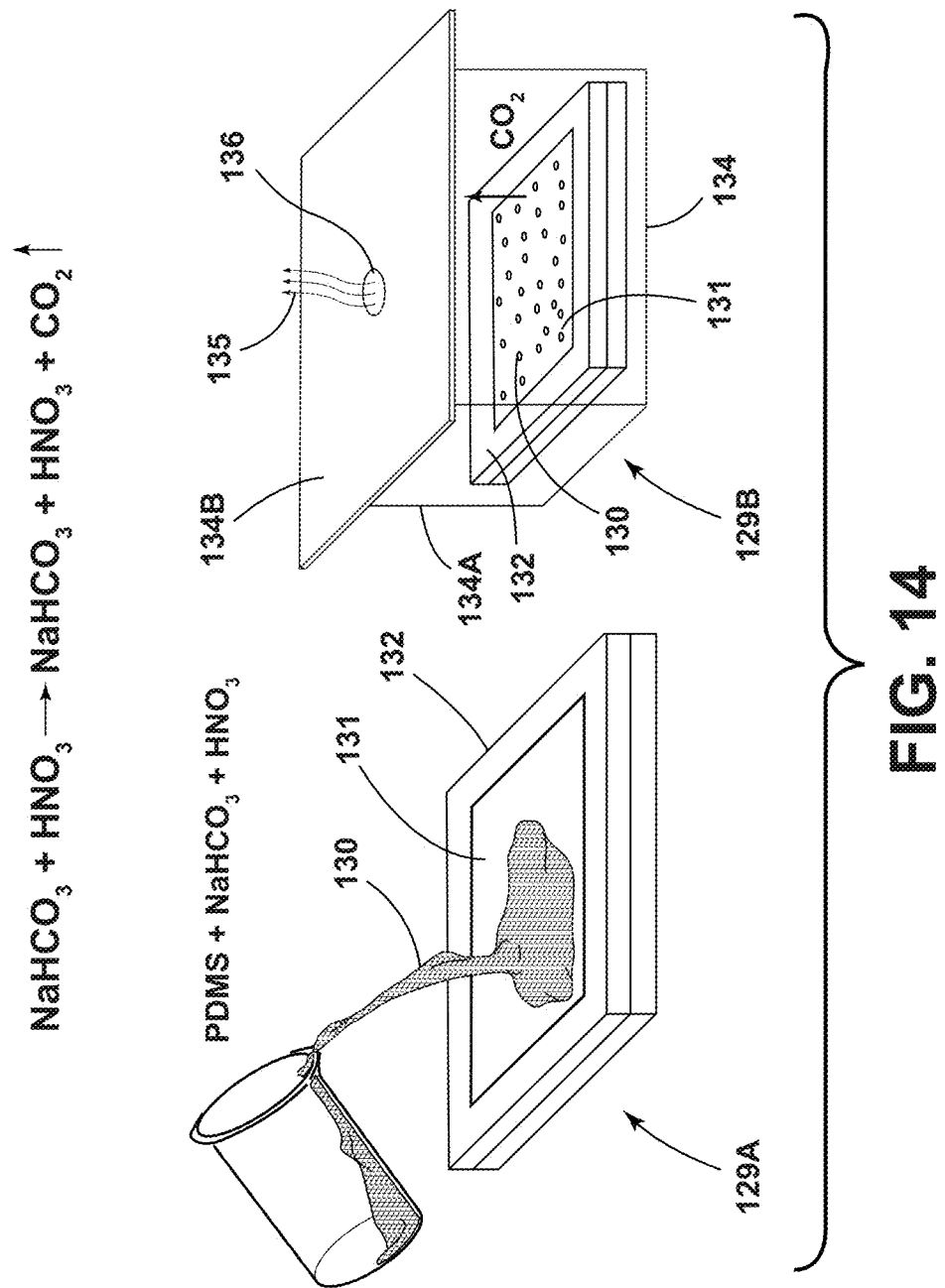
FIG. 14 is an isometric schematic showing fabrication of a porous PDMS dielectric layer.

With further reference to FIG. 14, porous dielectric material may be made using steps 129A and 129B. At step 129A, a mixture 130 of PDMS+Sodium Hydrogen Bicarbonate (NaHCO$_3$) (baking soda)+Nitric Acid (HNO$_3$) is poured into cavity 131 of a mold 132. The PDMS in mixture 130 may comprise a mixture of hardener and elastomer. As discussed in more detail below, various variables (e.g. curing temperature, HNO$_3$ content, and viscosity of the PDMS solution) may be controlled to increase or decrease porosity of dielectric material 115 as required for a particular application. In general, a more porous dielectric material 115 will have a lower Young's modulus. Thus, a given pressure acting on a pressure sensor 120 having a more porous dielectric material 115 will result in a larger deformation of the more porous dielectric material 115 (compared to a less porous dielectric material 115), which in turn results in a larger change in capacitance for a given applied pressure. The dielectric material 115 may be fabricated to have relatively high porosity whereby the pressure sensor 120 is capable of measuring relatively low pressures.

Figure 15:
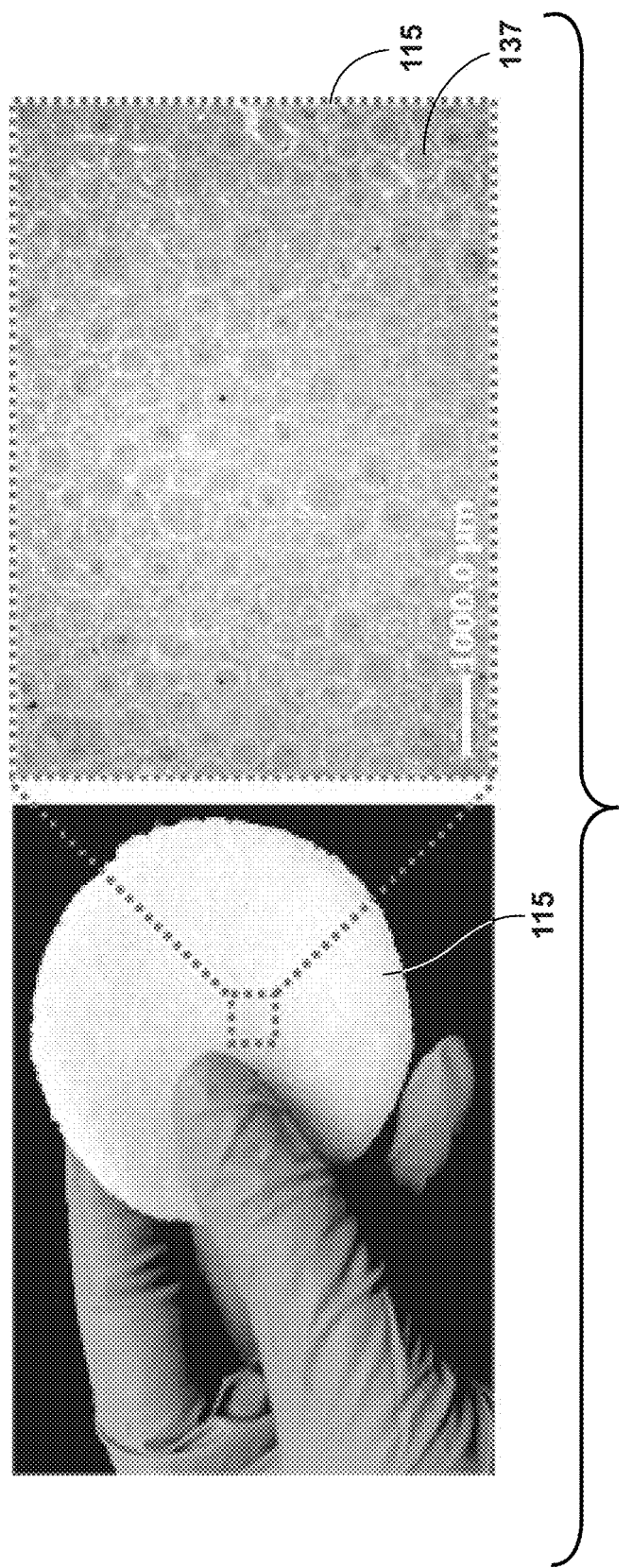
FIG. 15 is a microscopic image of a porous dielectric layer.

Referring again to FIG. 14, at a second step 129B, the mixture 130 in mold cavity 131 of mold 132 is annealed, thereby releasing water vapor and carbon dioxide (CO$_2$). The mold 132 and mixture 130 may be positioned in a container 134 having an opening 136 during the annealing process. As discussed in more detail below, container 134 may comprise a beaker 134A and a glass plate 134B. FIG. 15 is a microscopic image showing openings or pores 137 in the dielectric material 115.

Fabric Based Porous PDMS Pressure Sensor Fabrication

For the fabrication of a porous PDMS dielectric layer 115 according to a specific example, PDMS according to a specific example, pre-cursor and curing agent ratio (10:1, w/w) may be mixed with NaHCO$_3$ powder in a 5:1 (w/w) ratio (FIG. 14). Then, HNO$_3$ may be added to the PDMS-NaHCO$_3$ mixture in 1:5 (w/w) and stirred for about 10 minutes to control the liberation of CO$_2$ bubbles during the annealing process which in turn controls the pore size and distribution of pores. The mixture 130 (FIG. 14) was poured into a mold 132 and left for about 15 minutes to obtain proper spreading and release of the entrapped air bubbles. The mold 132 may then be placed inside a beaker 134A. The air flow around the mold 132, which can affect the uniformity of the pore size during the annealing process, may be controlled by closing the beaker 134A with a glass plate 134B. Lid 134B may have a small opening 136 in the center of lid 134B which acts as an exhaust for water vapors 135 produced during the decomposition of the NaHCO$_3$. Finally, the beaker 134A may be thermally annealed in an oven for 30 minutes at 140° C. During annealing, the NaHCO$_3$ decomposes, thereby liberating CO$_2$ gases to form a porous PDMS dielectric layer 115. The effect of varying the annealing temperature, the content of HNO$_3$, and PDMS viscosity (PDMS pre-cursor and curing agent ratio) are discussed below. The following chemical reaction illustrates the decomposition of NaHCO$_3$ during the annealing process:

$$NaHCO_3 + HNO_3 \rightarrow NaNO_3 + H_2O + CO_2\uparrow$$

Following this, the porous PDMS 115 may be immersed in a diluted solution of IPA and then sonicated in deionized water for a period of time (e.g. about 30 minutes) to remove the byproduct—sodium nitrate (NaNO$_3$) salt. The porous PDMS layer 115 may then be dried in an oven for a suitable period of time (e.g. about 2 hours) at a suitable temperature (e.g. about 100° C.).

Initially, a polymer (e.g. TPU) substrate 104 may be heated at 140° C. for 30 minutes for pre-print heat stabilization (e.g. step 102A, FIG. 7). A screen printer (AMI MSP 485) from Affiliated Manufacturers Inc. may be used to deposit conductive Ag ink on the substrate 104 to form conductive layer 105 (e.g. step 102B, FIG. 7). The screen used in the screen printer may be stainless-steel with mesh count, wire diameter, deflection angle and MS-22 emulsion thickness of 325, 28 μm, 22.5° and 12.7 μm, respectively. The screen printed Ag ink may be thermally cured at 130° C. for 8 minutes. Following this, the temperature stable carrier film was peeled off from the TPU substrate and placed on a fabric 108 (step 102C, FIG. 7). The substrate 104 was permanently attached to the fabric 108 by heat pressing it using a laminator (Geo Knight-DK20SP), for 30 seconds. The fabric-based electrodes and porous PDMS dielectric layer 115 were then patterned into circles with a diameter of 35 mm by using a laser-assisted cutting process. A permanent wiring technique was designed for the electrical connections by placing the ends 114 of stripped wires 111 on the Ag layer 105 of the fabric electrodes and laminating them using a new base film 112 (step 102E, FIG. 7). Finally, the laser patterned dielectric layer 115 was sandwiched between a top and bottom electrode 116A, 116B (step 102F, FIG. 7) to form a complete pressure sensor 120 using adhesive PDMS 122 (step 102F, FIG. 7).

Porosity Control Analysis

Sensor-to-sensor uniformity in capacitive pressure sensors with porous dielectric layers may be affected by variations in porosity. A substantially uniform pore size and distribution may be necessary for some applications (e.g. where an array of sensors is required). Higher concentration of pores and larger sizes of the pores typically results in greater deformation for a given load (pressure), which results in greater relative capacitance change for a given load. The liberation of the CO$_2$ gas (which leaves the pores in the PDMS solution) may be controlled/adjusted by varying the curing temperature, the amount of the HNO$_3$, and the viscosity of the PDMS solution. The sensor performance and porosity changes due to varying the content of HNO$_3$ (10%, 15%, and 20%) was investigated in terms of pore size, dielectric layer thickness, dielectric constant, and the relative capacitive change for applied pressures ranging from 0 to 1000 kPa. The thickness of the fabricated sensor for 10%, 20% and 30% HNO$_3$ in the PDMS solution was measured 1321 μm, 1661 μm, and 1680 μm, respectively. The average pore size was changed from 278 μm, 454 μm, and 496 μm by increasing the content of the nitric acid (Table 1) which justifies the increase in the thickness of the porous layer as well. An increase in the pore size can be attributed to more liberation of CO$_2$ gas, which resulted in a decreasing dielectric constant of 1.99 to 1.91 to 1.90, for 10%, 15%, and 20% nitric acid, respectively.

TABLE 1

Porous Pressure Sensor Features

| Nitric Acid | Pore Size (μm) | Thickness(d) (μm) | Dielectric Constant (∈) | BaseCap. (C.) (pF) | Cap. Change % (0-1000 kPa) |
|---|---|---|---|---|---|
| 10% (S4) | 278 ± 63 | 1321 ± 4 | 1.99 ± 0.02 | 11.7 ± 0.3 | 170 |
| 15% (S5) | 454 ± 89 | 1661 ± 4 | 1.91 ± 0.01 | 8.3 ± 0.2 | 282 |
| 20% (S6) | 496 ± 120 | 1680 ± 16 | 1.90 ± 0.01 | 8.2 ± 0.2 | 323 |

Figure 16:
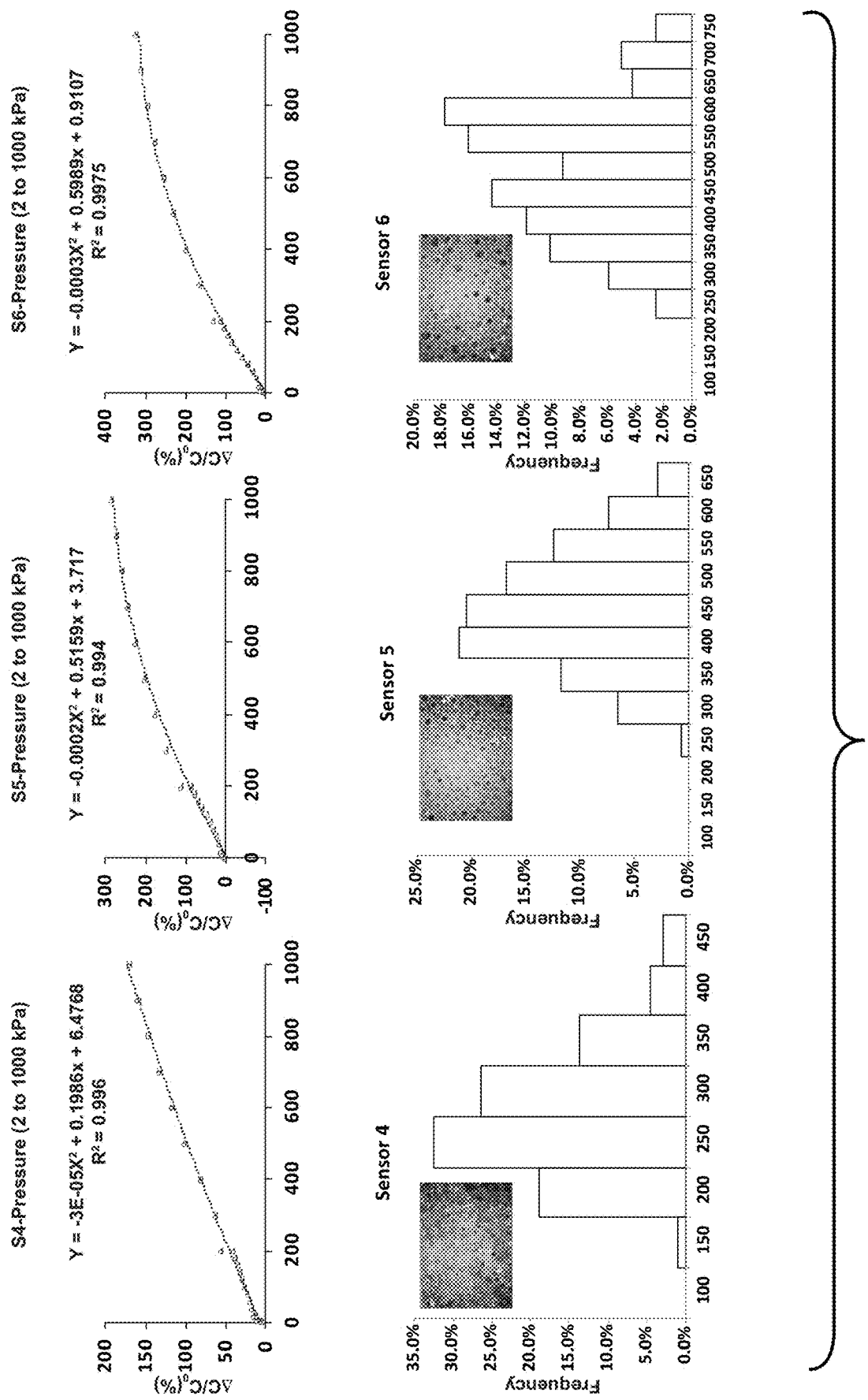
FIG. 16 comprises charts showing porosity and changes in capacitance for dielectric materials cured at different temperatures.

With reference to FIG. 16, the relative capacitance change was increased from 170% (for 10% nitric acid) to 282% (for 15% nitric acid) to 323% (for 20% nitric acid). This confirms that PDMS materials with larger pore sizes will tend to have more deformation for a given applied load.

Changing the viscosity of the PDMS before the annealing process and varying the annealing temperature are other factors (process parameters) that were also investigated. During the fabrication of porous PDMS layers, varying the pre-cursor/curing agent ratio changes the viscosity of the PDMS solution and thus affects the amount of the liberated $CO_2$ gas as well as the porosity of the fabricated porous PDMS layer 115.

Figure 17:
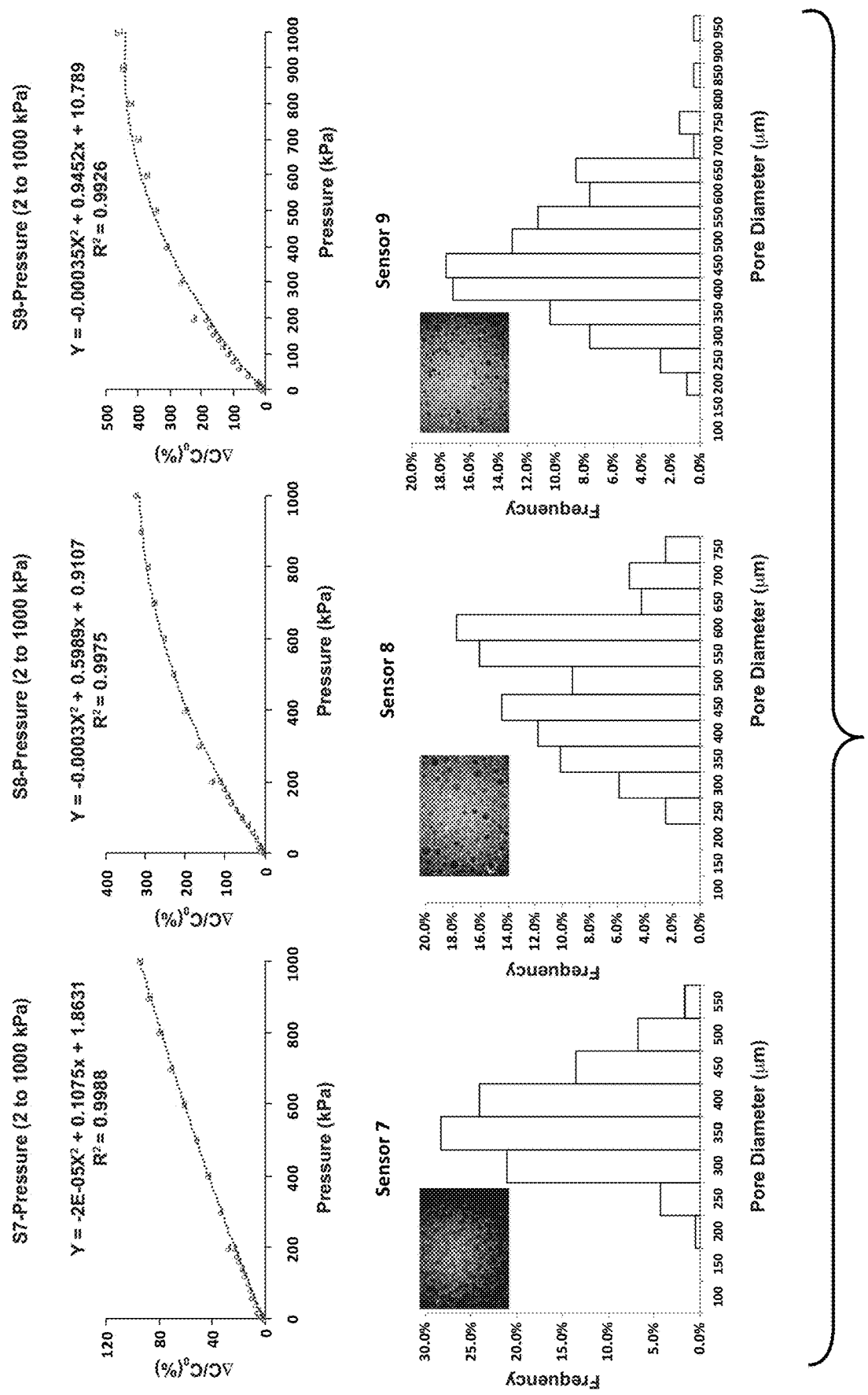
FIG. 17 comprises charts showing porosity and changes in capacitance for dielectric materials cured at varying PDMS viscosities.

To investigate the effect of viscosity on the pores size and distribution, three samples with different PDMS pre-cursor/curing agent ratios of 5:1, 10:1, and 15:1 were fabricated, and the porosity, thickness, and dielectric constant were measured for each sample as illustrated in FIG. 17 as well as Table 2.

TABLE 2

Porous Pressure Sensor Features

| PDMS Viscosity | Pore Size (μm) | Thickness(d) (μm) | Dielectric Constant (∈) | BaseCap. (C.) (pF) | Cap. Change % (0-1000 kPa) |
|---|---|---|---|---|---|
| 1:5 (S7) | 375 ± 67 | 1588 ± 10 | 2.09 ± 0.09 | 16.7 ± 0.2 | 94 |
| 1:10 (S8) | 496 ± 120 | 1680 ± 16 | 1.90 ± 0.01 | 8.2 ± 0.2 | 323 |
| 1:15 (S9) | 468 ± 120 | 1911 ± 4 | 1.80 ± 0.01 | 6.7 ± 0.1 | 460 |

Temperature effect was also studied by changing the annealing temperature from 110° C. to 140° C. to 170° C. It was observed that by increasing the PDMS pre-cursor/curing agent ratio (decreasing the viscosity of the PDMS solution) at a fixed annealing temperature of 140° C., the pore size tended to increase. On the other hand, increasing the annealing temperature (at a fixed 10:1 PDMS ratio), which accelerates the liberation of the $CO_2$ gas during the annealing process, resulted in a larger average pores size. The dielectric constant and the thickness of the fabricated porous PDMS layer (as expected) decreased and increased, respectively, for the samples with larger pore size as illustrated in Table 3.

TABLE 3

Porous Pressure Sensor Features

| Curing Temp. | Pore Size (μm) | Thickness(d) (μm) | Dielectric Constant (∈) | BaseCap. (C.) (pF) | Cap. Change % (0-1000 kPa) |
|---|---|---|---|---|---|
| 110° C. (S1) | 411 ± 79 | 997 ± 6 | 2.44 ± 0.02 | 18.6 ± 0.6 | 100 |
| 140° C. (S2) | 496 ± 120 | 1680 ± 16 | 1.90 ± 0.01 | 8.2 ± 0.2 | 323 |
| 170° C. (S2) | 502 ± 131 | 2078 ± 6 | 1.71 ± 0.01 | 6.2 ± 0.1 | 485 |

Figure 18:
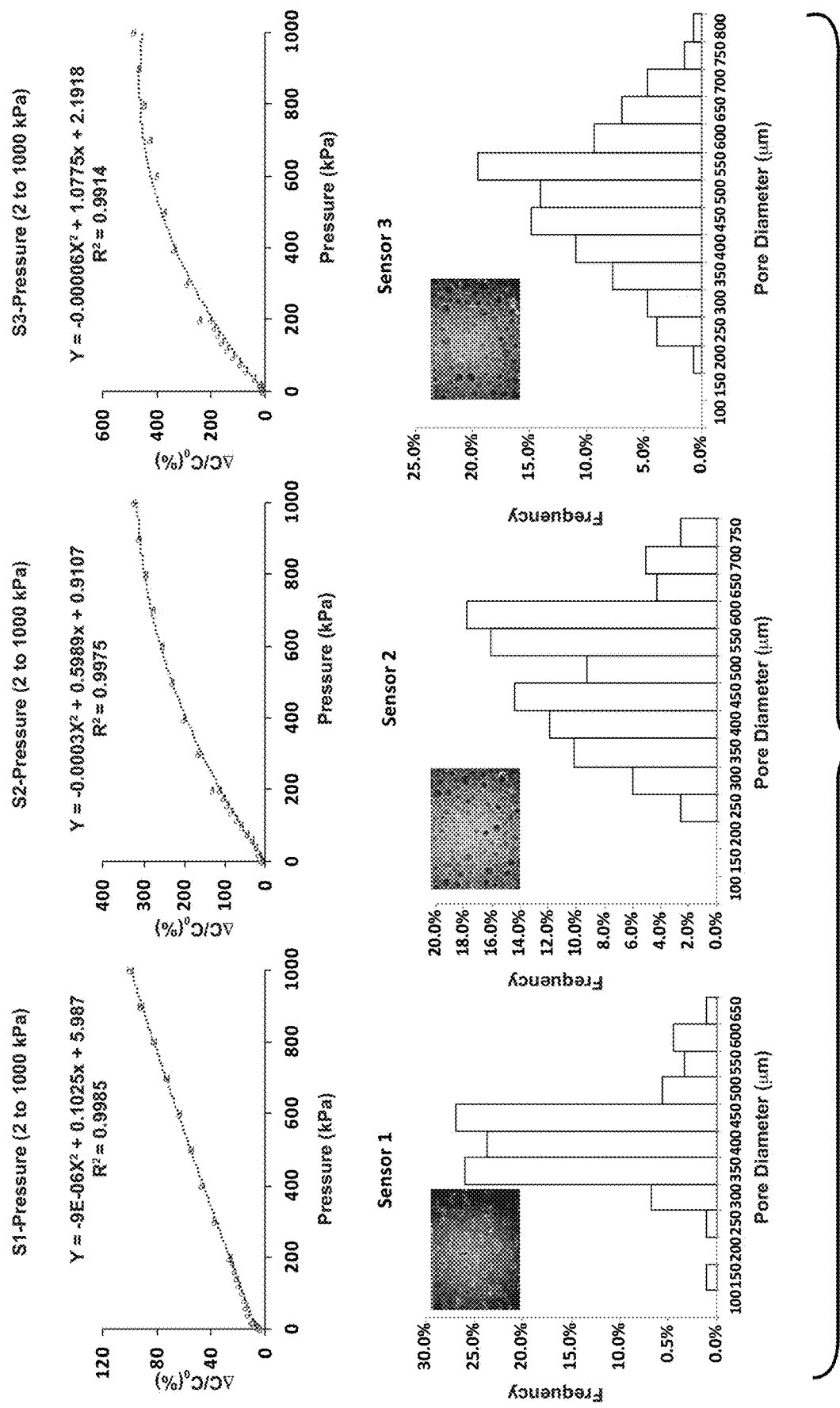
FIG. 18 comprises charts showing changes in porosity and capacitance at a fixed 10:1 PDMS ratio.

The relative capacitance change and pore size distribution are shown in FIG. 18.

Durability and Repeatability of the Fabricated Pressure Sensor

In addition to porosity variation, electrode structure and sensor attachment may affect the uniformity of the fabricated sensors 120. One potential cause of hysteresis and nonuniformity of prior sensors is weak attachment of the conductive electrode and the dielectric layer, as well as the durability of the wiring and the electrode layer. Also, environmental effects such as temperature and humidity, may cause a change in the base capacitance, slow recovery of the signal, and cause variation of the relative capacitance change over different loading/unloading cycles. In order to overcome the above-mentioned problems, a heat press lamination process (step 102E, FIG. 7) was performed as a permanent wiring technique. This process may, optionally, be used without hot/cold soldering or crimp connectors. Referring again to FIG. 7, for the attachment of the porous PDMS dielectric layer 115 to the fabricated flexible fabric electrodes 116A, 116B, a 50 μm thick adhesive PDMS (1:1 w/w) layer was bar coated on top of the fabricated electrodes (step 102F, FIG. 7) and the dielectric layer 115 was sandwiched between the electrodes 116A, 116B. The fabricated sensor 120 was then placed in an oven at a temperature of 80° C. for 1 hour to cure the adhesive layer.

It is to be understood that variations and modifications can be made on the aforementioned system and method without departing from the concepts of the present disclosure, and further it is to be understood that such concepts are intended to be covered by the following claims unless these claims by their language expressly state otherwise.

The invention claimed is:

1. A non-integrated pressure sensing system for measuring at least one pressure acting between a user's head and a protective helmet to enable comfortable fit of the helmet according to predefine comfort pressure criteria, the pressure sensing system comprising:
   a non-padded thin flexible cap configured to fit between an inside surface of a helmet and a user's head without fixing the thin flexible cap to the helmet, whereby the helmet can be positioned on a user's head without the thin flexible cap;
   a pressure sensor array comprising a plurality of pressure sensors secured to the cap, each pressure sensor including:
   a dielectric layer that is deformable in a thickness;
   a first electrode on a first side of the dielectric layer;
   a second electrode on a second side of the dielectric layer overlying and moveable toward and away from the first electrode by deformation of the dielectric layer, the dielectric layer maintaining a capacitance between the first electrode and the second electrode, the capacitance changing with a movement of the second electrode toward or away from the first electrode;
   wherein the pressure sensor array is configured to measure pressures in a range of 0 kPa to about 100 kPa, whereby a pressure resulting solely from the protective helmet when worn by the user in the absence of an impact of the protective helmet can be measured, and whereby the measured pressures can be evaluated to determine if the pressures satisfied predefined pressure comfort criteria;
   a data acquisition module connected to the flexible cap;
   a plurality of conductive lines operably interconnecting the pressure sensors to the data acquisition module whereby the data acquisition module is capable of providing data from the pressure sensor array to a user interface device; and:
   wherein the flexible cap is not integrated to the protective helmet such that the helmet and flexible cap can be used separately.

2. The non-integrated pressure sensing system of claim 1, wherein:
   the dielectric layer of each pressure sensor is flexible between a planar condition and a non-planar condition and including:
   a readout circuit electronically coupled with the first and second electrodes of the pressure sensors to measure a change in the capacitance and output a corresponding voltage.

3. The non-integrated pressure sensing system of claim 1, wherein:
   at least one of the first and second electrodes comprises a conductive ink disposed on a flexible base material, wherein the base material is selected from the group consisting of films and fabrics.

4. The non-integrated pressure sensing system of claim 3, wherein:
   the flexible base material comprises a polymer film layer and a fabric layer heat-bonded to the polymer film layer.

5. The non-integrated pressure sensing system of claim 1, wherein:
   the dielectric layer comprises a material selected from the group consisting of silicone elastomers and porous PDMS; and
   the first and second electrodes comprise first and second conductive layers that are heat press laminated to first and second fabric layers, respectively, by a layer of thermoplastic polymer material.

6. The non-integrated pressure sensing system of claim 1, wherein:
   the conductive lines comprise multi-strand wires having spaced-apart strands that are heat press laminated to the conductive layers by a layer of thermoplastic polymer material.

7. A method of measuring pressure between a protective helmet and a user's head in the absence of an impact on the protective helmet to determine if a fit of the protective helmet on the user's head satisfies predefined comfort fit criteria, the method comprising:
   providing a pressure sensing system including a flexible cap configured to fit between an inside surface of a protective helmet and a user's head; a pressure sensor array comprising a plurality of pressure sensors secured to the cap, each sensor including: 1) a dielectric layer that is deformable in a thickness; 2) a first electrode on a first side of the dielectric layer; 3) a second electrode on a second side of the dielectric layer overlying and moveable toward and away from the first electrode by deformation of the dielectric layer, the dielectric layer maintaining a capacitance between the first electrode and the second electrode, the capacitance changing with a movement of the second electrode toward or away from the first electrode; the pressure sensing system further comprising a data acquisition module connected to the flexible cap; and a plurality of conductive lines operably interconnecting the pressure sensors to the data acquisition module whereby the data acquisition module is capable of providing data from the pressure sensor array to a user interface device;
   positioning the flexible cap on a user's head;
   positioning a protective helmet over the flexible cap on the user's head; and
   utilizing changes in the capacitance of the pressure sensors to determine the measured pressure between the user's head and the protective helmet resulting from the protective helmet in the absence of an impact on the protective helmet;
   determining if a fit of the protective helmet on the user's head satisfies predefined comfort fit criteria based, at least in part, on the measured pressure.

8. The method of claim 7, wherein:
   the flexible cap is positioned on the user's head before the protective helmet is positioned over the flexible cap; and:
   the protective helmet is removed from the user's head before the flexible cap is removed.

9. The method of claim 7 wherein:
   the predefined comfort fit criteria comprises pressure that is no greater than 100 kPa, whereby the predefined comfort fit criteria is satisfied only if no pressures measured by the pressure sensor array exceed 100 kPa.

10. The method of claim 9, wherein:
    the predefined comfort fit criteria comprises pressure that is no greater than 80 kPa, whereby the predefined comfort fit criteria is satisfied only if no pressures measured by the pressure sensor array exceed 80 kPa.

11. The method of claim 7, wherein:
the predefined comfort fit criteria includes an upper bound and a lower bound, whereby the predefined comfort fit criteria is satisfied only if the measured pressure is within a range that is bounded by the upper bound and the lower bound;
the lower bound is about 1 kPa; and
the upper bound is about 100 kPa.

12. The method of claim 7, including:
modifying a contour of an inner surface of the protective helmet to provide a more comfortable fit based, at least in part, on the measured pressures.

13. The method of claim 7, wherein:
the flexible cap comprises a flexible fabric, and the sensors are adhesively bonded to the fabric.

14. A pressure sensing system for measuring at least one pressure sensor acting between a user's body and an article worn by the user, the pressure sensing system comprising:
a flexible sensing assembly configured to fit between an article and a user's body to measure pressure solely due to the article in the absence of an impact on the article;
the flexible sensing assembly including a pressure sensor array comprising a plurality of pressure sensors secured to a flexible material, each sensor including:
a dielectric layer that is deformable in a thickness;
a first electrode on a first side of the dielectric layer;
a second electrode on a second side of the dielectric layer overlying and movable toward and away from the first electrode by deformation of the dielectric layer, the dielectric layer maintaining a capacitance between the first electrode and the second electrode, the capacitance changing with a movement of the second electrode toward or away from the first electrode; and
whereby pressures in the range of about 0 kPa to about 100 kPa can be measured, such that pressures resulting solely from the article being worn by the user, in the absence of impacts on the article can be measured and compared to predefined comfort fit criteria to determine if the measured pressures satisfy the predetermined comfort fit criteria;
a plurality of conductors connected to the pressure sensors.

15. The pressure sensing system of claim 14, wherein:
the dielectric layers of the pressure sensor comprises a porous PDMS material.

16. The pressure sensing system of claim 15, wherein:
the first and second electrodes of the pressure sensors comprise conductive layers bonded to opposite sides of the dielectric layers;
the flexible material comprises fabric;
at least one conductive layer of each pressure sensor is heat press laminated to the fabric by a layer of thermoplastic polymer material; and
the conductors comprise multi-strand wires, each multi-strand wire having an end with spaced-apart strands that are heat press laminated to the conductive layer by a layer of thermoplastic polymer material.

17. A method of measuring pressure between a protective helmet and a user's head in the absence of impacts on the protective helmet to determine if the helmet fits the user's head, the method comprising:
providing a pressure sensing system including a flexible cap configured to fit between an inside surface of a protective helmet and a user's head without being fixed to the protective helmet; a pressure sensor array comprising a plurality of pressure sensors secured to the cap, each sensor including: 1) a dielectric layer that is deformable in a thickness; 2) a first electrode on a first side of the dielectric layer; 3) a second electrode on a second side of the dielectric layer overlying and moveable toward and away from the first electrode by deformation of the dielectric layer, the dielectric layer maintaining a capacitance between the first electrode and the second electrode, the capacitance changing with a movement of the second electrode toward or away from the first electrode;
positioning the flexible cap on a user's head;
followed by positioning a protective helmet over the flexible cap on the user's head whereby the helmet causes pressure on the user's head in the absence of impacts on the protective helmet;
utilizing changes in the capacitance of the pressure sensors to determine a plurality of measured pressures between the user's head and the protective helmet resulting from the protective helmet in the absence of an impact on the protective helmet; and
determining if the protective helmet fits the user's head based, at least in part, on the measured pressures.

18. The method of claim 17, wherein:
the pressure sensing system further includes a data acquisition module connected to the flexible cap and a plurality of conductive lines operably interconnecting the pressure sensors to the data acquisition module, whereby the data acquisition module is capable of providing data from the pressure sensor array to a user interface device.

19. The method of claim 17, wherein:
the pressure sensor array is configured to measure pressures at or below 100 kPa;
determining if the protective helmet fits the user's head includes comparing the plurality of measured pressures to predefined comfort fit criteria wherein the predefined comfort fit criteria comprises a measured pressure that is no greater than 100 kPa.

20. The method of claim 19, including:
modifying at least one of a shape and contour of an inner surface the protective helmet based, at least in part, on at least one of the measured pressures to thereby reduce a pressure resulting solely from wearing the protective helmet to a pressure that is below the maximum allowable pressure.

* * * * *